(12) United States Patent
Fujiwara

(10) Patent No.: US 8,237,854 B2
(45) Date of Patent: Aug. 7, 2012

(54) FLASH EMISSION METHOD AND FLASH EMISSION APPARATUS

(75) Inventor: Shinya Fujiwara, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 321 days.

(21) Appl. No.: 12/458,719

(22) Filed: Jul. 21, 2009

(65) Prior Publication Data

US 2010/0020200 A1    Jan. 28, 2010

(30) Foreign Application Priority Data

Jul. 22, 2008    (JP) .................................. 2008-188207

(51) Int. Cl.
*H04N 5/222* (2006.01)
*H04N 9/73* (2006.01)
*H04N 5/228* (2006.01)

(52) U.S. Cl. ...................... 348/371; 348/370; 348/224.1; 348/222.1

(58) Field of Classification Search .... 348/222.1–230.1, 348/370

See application file for complete search history.

(56) References Cited

U.S. PATENT DOCUMENTS

| | | | |
|---|---|---|---|
| 2006/0045510 A1* | 3/2006 | Odaka | 396/155 |
| 2007/0165960 A1* | 7/2007 | Yamada | 382/254 |
| 2008/0252749 A1 | 10/2008 | Fujiwara | |
| 2008/0297621 A1* | 12/2008 | Sun et al. | 348/224.1 |
| 2009/0102935 A1* | 4/2009 | Hung et al. | 348/222.1 |

FOREIGN PATENT DOCUMENTS

| | | |
|---|---|---|
| JP | 5-216087 | 8/1993 |
| JP | 2008-79143 | 4/2008 |

* cited by examiner

*Primary Examiner* — Sinh Tran
*Assistant Examiner* — Christopher K Peterson
(74) *Attorney, Agent, or Firm* — McGinn IP Law Group, PLLC

(57) ABSTRACT

According to the method and apparatus of the present invention, when a non-flash image that is taken without a flash emitted before main photographing and a flash image that is taken with the flash pre-emitted before the main photographing are obtained so that an amount of flash emission light for the main photographing (amount of main emission) based on the obtained non-flash image and flash image, a moving body in the angle of view is detected. If the detected moving body is a main object, the amount of main emission is calculated based on the image of the moving body. If the detected moving body is not the main object, the amount of main emission is calculated based on the image other than the moving body.

32 Claims, 17 Drawing Sheets

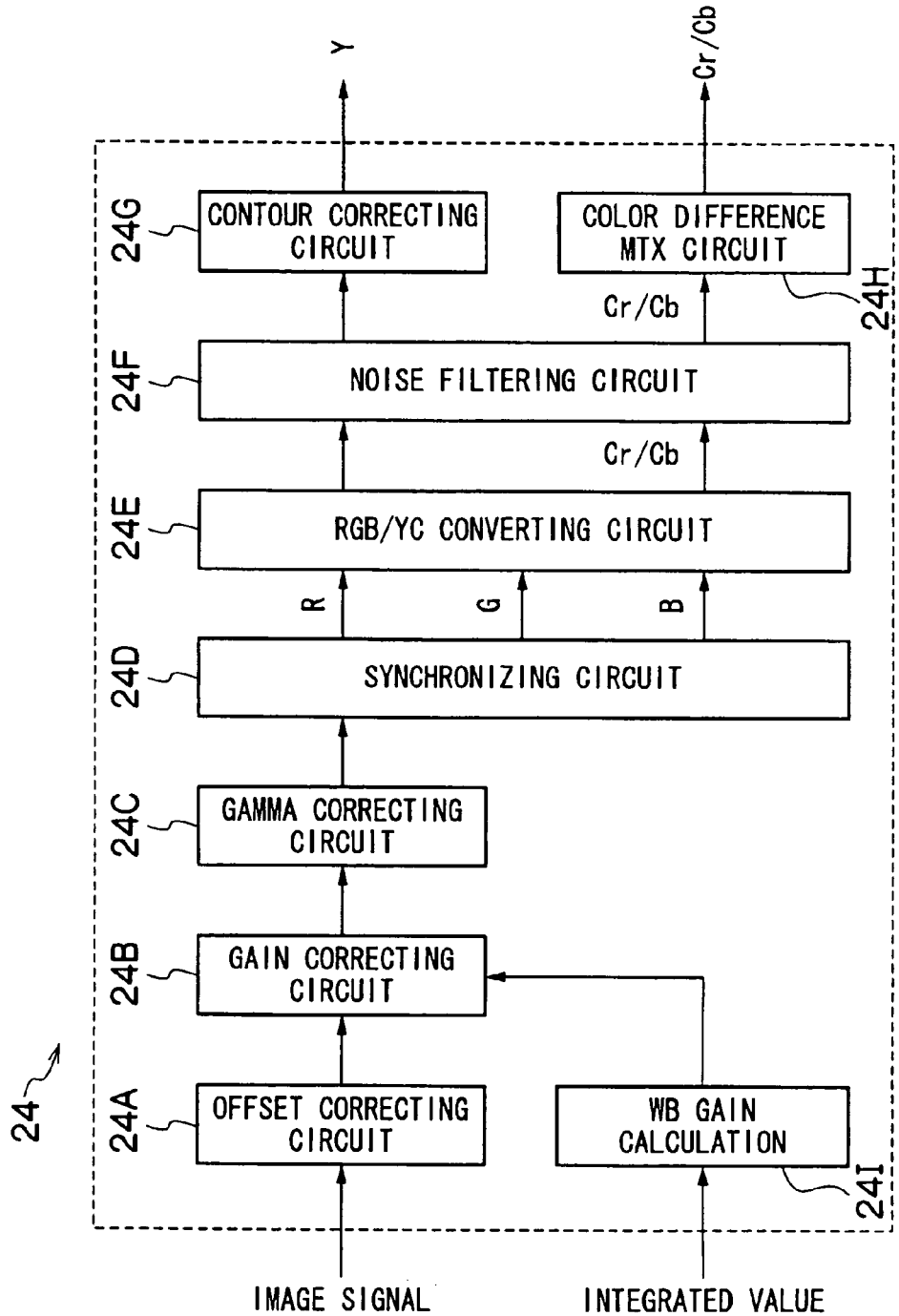

$N^{TH}$ FRAME IMAGE $(N+1)^{TH}$ FRAME IMAGE

FIG.6

| 1 | 1 | 1 | 1 | 1 | 1 | 1 | 1 | 1 |
|---|---|---|---|---|---|---|---|---|
| 0 | 0 | 0 | 2 | 2 | 0 | 0 | 0 | 1 |
| 0 | 0 | 0 | 5 | 5 | 0 | 0 | 0 | 1 |
| 1 | 2 | 5 | 10 | 10 | 5 | 2 | 0 | 1 |
| 1 | 2 | 5 | 10 | 10 | 5 | 2 | 0 | 1 |
| 1 | 2 | 5 | 5 | 5 | 5 | 5 | 0 | 1 |
| 1 | 2 | 2 | 2 | 2 | 2 | 2 | 0 | 1 |
| 1 | 2 | 1 | 1 | 1 | 1 | 1 | 1 | 1 |
| 1 | 1 | 1 | 1 | 1 | 1 | 1 | 1 | 1 |

WEIGHING FACTORS USED FOR CALCULATING AMOUNT OF MAIN EMISSION

=

| 1 | 1 | 1 | 1 | 1 | 1 | 1 | 1 | 1 |
|---|---|---|---|---|---|---|---|---|
| 0 | 0 | 0 | 1 | 1 | 0 | 0 | 0 | 1 |
| 0 | 0 | 0 | 1 | 1 | 0 | 0 | 0 | 1 |
| 1 | 1 | 1 | 1 | 1 | 1 | 1 | 0 | 1 |
| 1 | 1 | 1 | 1 | 1 | 1 | 1 | 0 | 1 |
| 1 | 1 | 1 | 1 | 1 | 1 | 1 | 0 | 1 |
| 1 | 1 | 1 | 1 | 1 | 1 | 1 | 0 | 1 |
| 1 | 1 | 1 | 1 | 1 | 1 | 1 | 1 | 1 |
| 1 | 1 | 1 | 1 | 1 | 1 | 1 | 1 | 1 |

WEIGHTS SET SEPARATELY TO MOVING BODY CONTAINING AREA AND MOVING BODY UNCONTAINING AREA

×

| 1 | 1 | 1 | 1 | 1 | 1 | 1 | 1 | 1 |
|---|---|---|---|---|---|---|---|---|
| 1 | 2 | 2 | 2 | 2 | 2 | 2 | 2 | 1 |
| 1 | 2 | 5 | 5 | 5 | 5 | 5 | 2 | 1 |
| 1 | 2 | 5 | 10 | 10 | 5 | 2 | 2 | 1 |
| 1 | 2 | 5 | 10 | 10 | 5 | 2 | 2 | 1 |
| 1 | 2 | 5 | 5 | 5 | 5 | 5 | 2 | 1 |
| 1 | 2 | 2 | 2 | 2 | 2 | 2 | 2 | 1 |
| 1 | 2 | 1 | 1 | 1 | 1 | 1 | 1 | 1 |
| 1 | 1 | 1 | 1 | 1 | 1 | 1 | 1 | 1 |

WEIGHING FACTORS SET TO AREAS BEFOREHAND

FIG.10A  FIG.10B
NON-FLASH IMAGE  FLASH IMAGE
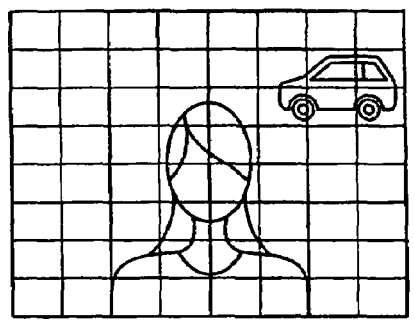 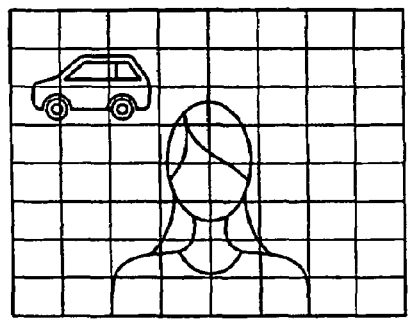
↓ MOVING BODY CONTAINING AREA EXTRACTION ↓
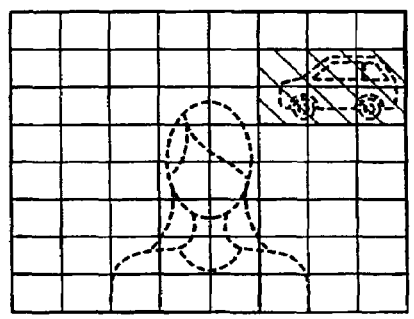
↓ WEIGHT SETTING ↓
| 1 | 1 | 1 | 1 | 1 | 1 | 1 | 1 |
|---|---|---|---|---|---|---|---|
| 1 | 1 | 1 | 1 | 1 | 0 | 0 | 0 |
| 1 | 1 | 1 | 1 | 1 | 0 | 0 | 0 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
|---|---|---|---|---|---|---|---|
| 0 | 0 | 0 | 1 | 1 | 1 | 1 | 1 |
| 0 | 0 | 0 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FLASH EMISSION METHOD AND FLASH EMISSION APPARATUS

BACKGROUND OF THE INVENTION

1. Field of the Invention

The present invention relates to a flash emission method and a flash emission apparatus, and more particularly to a flash emission method and a flash emission apparatus that take an image with a flash emitted (flash image) prior to main emission and an image without a flash emitted (non-flash image) prior to main emission and determine the amount of emission light for the main emission based on those flash and non-flash images taken.

2. Description of the Related Art

One of the known techniques of determining the amount of flash emission light for the main emission (main photographing) is so-called "CCD light adjusting" (for example, Japanese Patent Application Laid-Open No. 2008-79143). In the CCD light adjusting technique, an image is taken with a flash pre-emitted in a predetermined amount (flash image) and another image is taken without a flash emitted (non-flash image) so that the amount of emission light for the main emission is determined based on the flash and non-flash images (the amount of emission light for the main emission is determined based on the amount of pre-emission light that influences the image by comparing the flash image and the non-flash image).

As a method for photographing a moving body, Japanese Patent Application Laid-Open No. H05-216087 discloses a method of finding a distance from a moving body, and if the distance from the moving body is short, photographing the moving body with a low aperture and a flash emitted.

When the amount of flash emission light is determined using the CCD light adjusting technique, two images of the flash image and the non-flash image are required. A drawback of the technique is that it cannot calculate the proper amount of emission light from the images if a moving body is taken in the angle of view or if the object is moving during the image capturing as the two images are taken serially. Especially, the drawback is that an excessively bright image or an excessively dark image is taken if a light source (neon lamp or the like) is in the background or if an image is taken as backlit since they significantly affect the image capturing.

SUMMARY OF THE INVENTION

The present invention is adapted in view of the circumstances, and an object of the present invention is to provide a flash emission method and a flash emission apparatus that have a proper amount of flash light emitted in taking an image that contains a moving body in a flash photographing mode.

In order to achieve the object, a first aspect of the present invention provides a flash emission method comprising the steps of: obtaining a non-flash image that is taken without a flash emitted; obtaining a flash image that is taken with a flash emitted in a predetermined amount of emission light; extracting an area that contains a moving body from the non-flash image obtained; extracting an area that contains a moving body from the flash image obtained; extracting a moving body uncontaining area that contains no moving body in both of the non-flash image and the flash image; calculating an amount of emission light for main emission based on an image of the moving body uncontaining area in the non-flash image and an image of the moving body uncontaining area in the flash image; and causing main emission of the flash in the calculated amount of emission light.

According to the first aspect of the present invention, when the amount of emission light for the main emission is obtained from the non-flash image and the flash image, an area that contains a moving body is extracted from the obtained non-flash image and flash image, and the amount of emission light is obtained based on the image of the area that contains no moving body in both of the non-flash image and flash image (moving body uncontaining area). That is, the amount of emission light for the main emission is obtained based on the regions of the images other than the regions that contain a moving body (=the amount of emission light for the main emission is obtained by removing the region that contains a moving body from the non-flash image and the flash image). That can cause the flash to be emitted in a proper amount of emission light so as to provide a good image even if the moving body is in the angle of view.

In order to achieve the object, a second aspect of the present invention provides a flash emission method comprising the steps of: obtaining a non-flash image that is taken without a flash emitted; obtaining a flash image that is taken with a flash emitted in a predetermined amount of emission light; dividing the obtained non-flash image into a plurality of areas; dividing the obtained flash image into a plurality of areas; extracting an area that contains a moving body from the non-flash image divided; extracting an area that contains a moving body from the flash image divided; calculating luminance for each area in the non-flash image divided; calculating luminance for each area in the flash image divided; obtaining a difference value of luminance for each area by calculating a difference of luminance between each area in the non-flash image and each area in the flash image, wherein the luminance is calculated for each area; setting a weight to be given to each area by grouping the areas into areas each of which contains a moving body and areas each of which contains no moving body; obtaining reflection luminance by calculating a weighted mean by adding the weight to the calculated difference value of luminance for each area; obtaining non-flash luminance by calculating a weighted mean by adding the weight to the luminance for each area in the non-flash image; calculating an amount of emission light for main emission based on the obtained reflection luminance and non-flash luminance; and causing main emission of the flash in the calculated amount of emission light.

According to the second aspect of the present invention, when the amount of emission light for the main emission is obtained from the non-flash image and the flash image, an area that contains a moving body is extracted from the obtained non-flash image and flash image, and weights to be given to each area is set by grouping the areas into areas each of which contains a moving body and areas each of which contains no moving body. That can cause the flash to be emitted in a proper amount of emission light so as to provide a good image even if the moving body is in the angle of view.

In order to achieve the object, a third aspect of the present invention provides the flash emission method according to the second aspect, wherein the step of setting a weight to be given to each area comprises the steps of: setting a weight to be given to each area by grouping the areas in the non-flash image into areas each of which contains a moving body and areas each of which contains no moving body; setting a weight to be given to each area by grouping the areas in the flash image into areas each of which contains a moving body and areas each of which contains no moving body; and setting a weight to be given to each area by mixing the weight set to each area in the non-flash image and the weight set to each area in the flash image.

According to the third aspect of the present invention, when a weight to be given to each area is set, the weight is individually set by grouping the areas into areas each of which contains a moving body and areas each of which contains no moving body in both of the non-flash image and the flash image, and the weight is set by mixing the weight set to each area. That can make the weight to be given to each area simply and properly set.

In order to achieve the object, a fourth aspect of the present invention provides the flash emission method according to the second or third aspect of the present invention, wherein the step of setting a weight to be given to each area sets the weight to be given to each area by setting the weight to be given to each area which contains a moving body lower than the weight to be given to each area which contains no moving body.

According to the forth aspect of the present invention, when a weight to be given to each area is set, the weight to be given to each area which contains a moving body is set lower than the weight to be given to each area which contains no moving body. That enables the amount of emission light to be obtained by eliminating the influence of the moving body.

In order to achieve the object, a fifth aspect of the present invention provides a flash emission method comprising the steps of: obtaining a non-flash image that is taken without a flash emitted; obtaining a flash image that is taken with a flash emitted in a predetermined amount of emission light; extracting an area that contains a moving body from the non-flash image obtained; extracting an area that contains a moving body from the flash image obtained; calculating an amount of emission light for main emission based on an image of an area that contains the moving body in the non-flash image and an image of an area that contains the moving body in the flash image; and causing main emission of the flash in the calculated amount of emission light.

According to the fifth aspect of the present invention, an amount of emission light for main emission is determined based on an image of an area that contains the moving body in the non-flash image and an image of an area that contains the moving body in the flash image. That can cause the flash to be emitted in a proper amount of emission light so as to provide a good image even if the main object is moving.

In order to achieve the object, a sixth aspect of the present invention provides a flash emission method comprising the steps of: obtaining a non-flash image that is taken without a flash emitted; obtaining a flash image that is taken with a flash emitted in a predetermined amount of emission light; extracting an area that contains a moving body from the non-flash image obtained; extracting an area that contains a moving body from the flash image obtained; determining whether a moving body is a main object or not; when the moving body is the main object, calculating an amount of emission light for main emission based on an image of an area that contains the moving body in the non-flash image and an image of an area that contains the moving body in the flash image; when the moving body is not the main object, extracting a moving body uncontaining area that contains no moving body in both of the non-flash image and the flash image, and calculating an amount of emission light for main emission based on an image of the moving body uncontaining area in the non-flash image and an image of the moving body uncontaining area in the flash image; and causing main emission of the flash in the calculated amount of emission light.

According to the sixth aspect of the present invention, when the main object is moving (when the moving body is the main object), the amount of emission light for the main emission is determined based on the image of the area that contains the moving body in the non-flash image and the image of the area that contains the moving body in the flash image; and when the main object is not moving (when the moving body is not the main object), the amount of emission light for the main emission is determined based on the image of the moving body uncontaining area in the non-flash image and the image of the moving body containing area in the flash image. That can cause the flash to be emitted in a proper amount of emission light according to the scene so as to provide a good image.

In order to achieve the object, a seventh aspect of the present invention provides the flash emission method according to the sixth aspect of the present invention, wherein the step of determining whether a moving body is a main object or not determines whether the moving body is a face or not, and when the moving body is a face, determining that the moving body is the main object.

According to the seventh aspect of the present invention, when the moving body is a face, it is determined that the moving body is the main object.

In order to achieve the object, an eighth aspect of the present invention provides the flash emission method according to any one of the first to seventh aspect of the present invention, wherein the extraction of the area that contains the moving body is executed by identifying the moving body based on the non-flash image and flash image obtained, and extracting an area that contains the identified moving body.

According to the eighth aspect of the present invention, the moving body is identified based on the non-flash image and the flash image obtained.

In order to achieve the object, a ninth aspect of the present invention provides the flash emission method according to any one of the first to eighth aspect of the present invention, wherein the extraction of the area that contains the moving body is executed by identifying the moving body based on an image that is obtained before the non-flash image and the flash image are obtained and extracting an area that contains the identified moving body.

According to the ninth aspect of the present invention, the moving body is identified based on the image obtained before the non-flash image and the flash image are obtained (for example, through-the-lens image).

In order to achieve the object, a tenth aspect of the present invention provides a flash emission apparatus comprising: a non-flash image obtaining device that obtains a non-flash image that is taken without a flash emitted; a flash image obtaining device that obtains a flash image that is taken with a flash emitted in a predetermined amount of emission light; a first moving body containing area extracting device that extracts an area that contains a moving body from the non-flash image obtained by the non-flash image obtaining device; a second moving body containing area extracting device that extracts an area that contains a moving body from the flash image obtained by the flash image obtaining device; a moving body uncontaining area extracting device that extracts a moving body uncontaining area that contains no moving body in both of the non-flash image and the flash image; an emission light amount calculating device that calculates an amount of emission light for main emission based on an image of the moving body uncontaining area in the non-flash image and an image of the moving body uncontaining area in the flash image; and an emission controlling device that causes main emission of the flash in the amount of emission light calculated by the emission light amount calculating device.

According to the tenth aspect of the present invention, when the amount of emission light for the main emission is obtained from the non-flash image and the flash image, an area that contains a moving body is extracted from the obtained non-flash image and flash image, and the amount of emission light is obtained based on the image of the area that contains no moving body in both of the non-flash image and flash image (moving body uncontaining area). That can cause the flash to be emitted in a proper amount of emission light so as to provide a good image even if the moving body is in the angle of view.

In order to achieve the object, an eleventh aspect of the present invention provides a flash emission apparatus comprising: a non-flash image obtaining device that obtains a non-flash image that is taken without a flash emitted; a flash image obtaining device that obtains a flash image that is taken with a flash emitted in a predetermined amount of emission light; a first area dividing device that divides the non-flash image into a plurality of areas; a second area dividing device that divides the flash image into a plurality of areas; a first moving body containing area extracting device that extracts an area that contains a moving body from the non-flash image that is divided by the first area dividing device into a plurality of areas; a second moving body containing area extracting device that extracts an area that contains a moving body from the flash image that is divided by the second area dividing device into a plurality of areas; a first luminance calculating device that calculates luminance for each area in the non-flash image divided by the first area dividing device into a plurality of areas; a second luminance calculating device that calculates luminance for each area in the flash image divided by the second area dividing device into a plurality of areas; a difference value calculating device that calculates a difference value for each area, the difference value between each area in the non-flash image and each area in the flash image, wherein the luminance is calculated for each area; a weight setting device that sets a weight to be given to each area by grouping the areas into areas each of which contains a moving body and areas each of which contains no moving body; a reflection luminance calculating device that calculates reflection luminance by calculating a weighted mean by adding the weight set by the weight setting device to the difference value of luminance for each area that is calculated by the difference value calculating device; a non-flash image luminance calculating device that calculates the non-flash luminance by calculating a weighted mean by adding the weight set by the weight setting device to the luminance for each area in the non-flash image; a main emission amount calculating device that calculates an amount of emission light for main emission based on the reflection luminance that is calculated by the reflection luminance calculating device and the non-flash luminance that is calculated by the non-flash image luminance calculating device; and an emission controlling device that causes main emission of the flash in the amount of emission light calculated by the main emission amount calculating device.

According to the eleventh aspect of the present invention, when the amount of emission light for the main emission is obtained from the non-flash image and the flash image, an area that contains a moving body is extracted from the obtained non-flash image and flash image, and weights to be given to each area is set by grouping the areas into areas each of which contains a moving body and areas each of which contains no moving body. That can cause the flash to be emitted in a proper amount of emission light so as to provide a good image even if the moving body is in the angle of view.

In order to achieve the object, a twelfth aspect of the present invention provides the flash emission apparatus according to the eleventh aspect of the present invention, wherein the weight setting device sets a weight to be given to each area by grouping the areas in the non-flash image into areas each of which contains a moving body and areas each of which contains no moving body; sets a weight to be given to each area by grouping the areas in the flash image into areas each of which contains a moving body and areas each of which contains no moving body; and sets a weight to be given to each area by mixing the weight set to each area in the non-flash image and the weight set to each area in the flash image.

According to the twelfth aspect of the present invention, when a weight to be given to each area is set, the weight is individually set by grouping the areas into areas each of which contains a moving body and areas each of which contains no moving body in both of the non-flash image and the flash image, and the weight is set by mixing the weight set to each area. That can make the weight to be given to each area simply and properly set.

In order to achieve the object, a thirteenth aspect of the present invention provides the flash emission apparatus according to the eleventh or twelfth aspect of the present invention, wherein the weight setting device sets the weight to be given to each area by setting the weight to be given to each area which contains a moving body lower than the weight to be given to each area which contains no moving body.

According to the thirteenth aspect of the present invention, when a weight to be given to each area is set, the weight to be given to each area which contains a moving body is set lower than the weight to be given to each area which contains no moving body. That enables the amount of emission light to be obtained by eliminating the influence of the moving body.

In order to achieve the object, a fourteenth aspect of the present invention provides a flash emission apparatus comprising: a non-flash image obtaining device that obtains a non-flash image that is taken without a flash emitted; a flash image obtaining device that obtains a flash image that is taken with a flash emitted in a predetermined amount of emission light; a first moving body containing area extracting device that extracts an area that contains a moving body from the non-flash image obtained by the non-flash image obtaining device; a second moving body containing area extracting device that extracts the area that contains a moving body from the flash image obtained by the flash image obtaining device; an emission light amount calculating device that calculates an amount of emission light for main emission based on an image of an area extracted by the first moving body containing area extracting device and an image of an area extracted by the second moving body containing area extracting device; and an emission controlling device that causes main emission of the flash in the amount of emission light calculated by the emission light amount calculating device.

According to the fourteenth aspect of the present invention, an amount of emission light for main emission is determined based on an image of an area that contains the moving body in the non-flash image and an image of an area that contains the moving body in the flash image. That can cause the flash to be emitted in a proper amount of emission light so as to provide a good image even if the main object is moving.

In order to achieve the object, a fifteenth aspect of the present invention provides a flash emission apparatus comprising: a non-flash image obtaining device that obtains a non-flash image that is taken without a flash emitted; a flash image obtaining device that obtains a flash image that is taken with a flash emitted in a predetermined amount of emission light; a first moving body containing area extracting device that extracts an area that contains a moving body from the non-flash image obtained by the non-flash image obtaining device; a second moving body containing area extracting device that extracts the area that contains a moving body from the flash image obtained by the flash image obtaining device; a determining device that determines whether a moving body is a main object or not; a first emission light amount calculating device that calculates an amount of emission light for main emission based on an image of an area that contains the moving body in the non-flash image and an image of an area that contains the moving body in the flash image, when the moving body is the main object; a second emission light amount calculating device that extracts a moving body uncontaining area that contains no moving body in both of the non-flash image and the flash image, and calculates the amount of emission light for the main emission based on the image of the moving body uncontaining area in the non-flash image and the image of the moving body uncontaining area in the flash image, when the moving body is not the main object; and an emission controlling device that causes main emission of the flash in the amount of emission light calculated by the first emission light amount calculating device or the second emission light amount calculating device.

According to the fifteenth aspect of the present invention, when the main object is moving (when the moving body is the main object), the amount of emission light for the main emission is determined based on the image of the area that contains the moving body in the non-flash image and the image of the area that contains the moving body in the flash image; and when the main object is not moving (when the moving body is not the main object), the amount of emission light for the main emission is determined based on the image of the moving body uncontaining area in the non-flash image and the image of the moving body uncontaining area in the flash image. That can cause the flash to be emitted in a proper amount of emission light according to the scene so as to provide a good image.

In order to achieve the object, a sixteenth aspect of the present invention provides the flash emission apparatus according to the fifteenth aspect of the present invention, comprising: a first face extracting device that extracts a face from the non-flash image that is obtained by the non-flash image obtaining device; and a second face extracting device that extracts the face from the flash image that is obtained by the flash image obtaining device; wherein the determining device determines whether the moving body is the face or not, and when the moving body is the face, determines that the moving body is the main object.

According to the sixteenth aspect of the present invention, when the moving body is a face, it is determined that the moving body is the main object.

In order to achieve the object, a seventeenth aspect of the present invention provides the flash emission apparatus according to any one of the tenth to sixteenth aspect of the present invention, comprising: a moving body identifying device that identifies the moving body based on the non-flash image obtained by the non-flash image obtaining device and the flash image obtained by the flash image obtaining device; wherein the first moving body containing area extracting device and the second moving body containing area extracting device extract an area that contains the moving body identified by the moving body identifying device from the non-flash image and the flash image.

According to the seventeenth aspect of the present invention, the moving body is identified based on the non-flash image and the flash image obtained.

In order to achieve the object, an eighteenth aspect of the present invention provides the flash emission apparatus according to any one of tenth to seventeenth aspect of the present invention, comprising: a serial image obtaining device that serially obtains images before obtaining the non-flash image and the flash image; and a moving body identifying device that identifies the moving body based on the images that are serially obtained by the serial image obtaining device; wherein the first moving body containing area extracting device and the second moving body containing area extracting device extract an area that contains the moving body identified by the moving body identifying device from the non-flash image and the flash image.

According to the eighteenth aspect of the present invention, the moving body is identified based on the image obtained before the non-flash image and the flash image are obtained (for example, through-the-lens image).

According to the present invention, a flash can be emitted in a proper amount when an image containing a moving body is taken with a flash emitted.

BRIEF DESCRIPTION OF THE DRAWINGS

FIG. 2 is a block diagram showing a configuration of a digital signal processing section;

FIG. 6 is a conceptual diagram of a method for determining weighing factors;

FIGS. 10A and 10B are conceptual diagrams of weighing;

DETAILED DESCRIPTION OF THE PREFERRED EMBODIMENTS

Preferred embodiments of the flash emission method and the flash emission apparatus according to the present invention will be described with reference to the attached drawings.

First Embodiment

Figure 1:
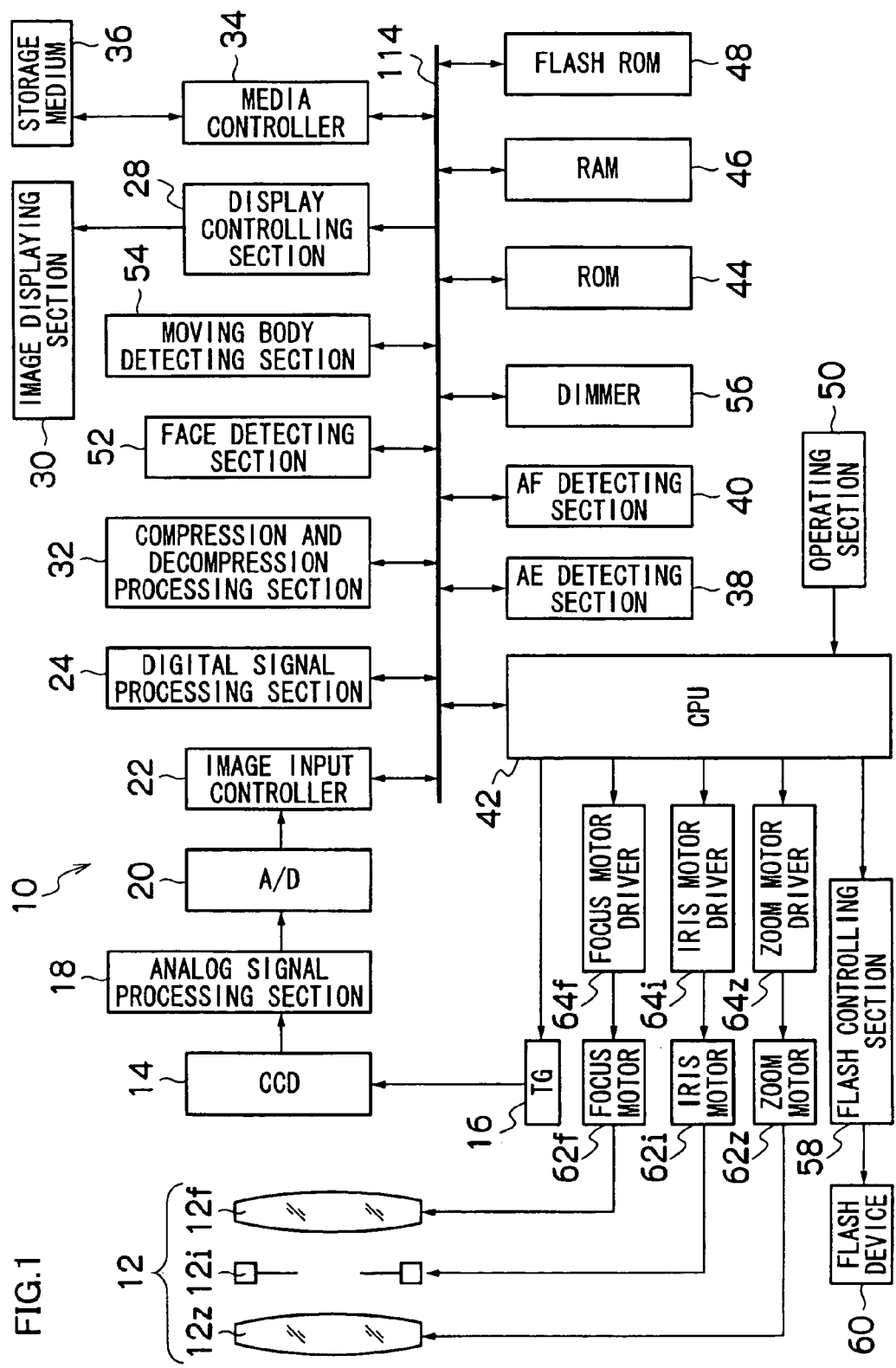
FIG. 1 is a block diagram showing an embodiment of a configuration of a digital camera to which the present invention is applied.

FIG. 1 is a block diagram showing an embodiment of the configuration of a digital camera to which the present invention is applied.

As shown in FIG. 1, a digital camera 10 of the embodiment includes an image pickup optical system 12, an image sensor (CCD) 14, a timing generator (TG) 16, an analog signal processing section 18, an A/D converter 20, an image input controller 22, a digital signal processing section 24, a display controlling section 28, an image displaying section 30, a compression and decompression processing section 32, a media controller 34, a storage medium 36, an AE detecting section 38, an AF detecting section 40, a central processing unit (CPU) 42, a ROM 44, a RAM 46, a flash ROM 48, an operating section 50, a face detecting section 52, a moving body detecting section 54, a dimmer 56, a flash controlling section 58, and a flash device 60.

The operating section 50 has a shutter button, a power switch, an image pickup mode and reproduction mode selecting switch, a back switch, a menu and OK switch, and multifunction direction keys. In response to input from the operating section 50, respective processes are executed.

The shutter button of the digital camera 10 of the embodiment is a two stroke switch including a switch S1 which is turned on in response to half pressure and a switch S2 which is turned on in response to full pressure.

The CPU 42 controls over the operations of the entire digital camera 10 by controlling respective sections of the digital camera 10 according to predetermined programs based on the input from the operating section 50.

In addition to the programs executed by the CPU 42, data required for the control such as a program chart is stored in the ROM 44. The CPU 42 expands the programs stored in the ROM 44 into the RAM 46 so as to execute the respective processes by using the RAM 46 as a working area. In the flash ROM 48, various setting information and the like on the operations of the digital camera 10 such as user setting information are stored.

The image pickup optical system 12 is a zoom lens device including a zoom lens 12z for zooming, a focus lens 12f for focusing, and a diaphragm 12i for adjusting the quantity of light.

A zoom motor 62z drives the zoom lens 12z forward and backward on the photographing optical axis, and thereby the focal length changes.

A focus motor 62f drives the focus lens 12f forward and backward on the photographing optical axis, and thereby the focal position changes.

An iris motor 62i drives the diaphragm 12i, which is, for example, an iris diaphragm, and thereby the aperture (focus value) continuously or gradually changes.

The CPU 42 controls the driving of the zoom motor 62z, the focus motor 62f, and the iris motor 62i by a zoom motor driver 64z, a focus motor driver 64f, and an iris motor driver 64i so as to control the operations of the zoom lens 12z, the focus lens 12f, and the diaphragm 12i.

The image sensor 14 is a color CCD with a predetermined color filter array (for example, the Bayer array) (hereinafter, referred to as "CCD"). A light incident on a light receiving surface of the CCD 14 through the image pickup optical system 12 is converted by each photodiode arranged on the light receiving surface, into a signal charge the amount of which corresponds to the amount of incident light. The signal charges accumulated in the photodiodes are read out according to timing signals provided from the timing generator (TG) 16 and sequentially outputted from the CCD 14 as voltage signals (image signals).

The CCD 14 has a shutter gate and a shutter drain. The CCD 14 can sweep out the signal charges accumulated in the photodiodes into the shutter drain by providing shutter gate pulses to the shutter gate. The CPU 42 controls a charge accumulation time for the signal charges to be accumulated in the photodiodes (shutter speed of a so-called electronic shutter) by controlling the application of the shutter gate pulses to the shutter gate using the TG 16.

Although the image sensor 14 is a CCD in the embodiment, the image sensor 14 may be of any other structure such as CMOS.

The analog signal processing section 18 includes a CDS circuit and an analog amplifier. The CDS circuit performs correlated double sampling (CDS) on CCD output signals based on CDS pulses provided from the TG 16. The analog amplifier amplifies image signals outputted from the CDS circuit with gains set in accordance with image capturing sensitivity provided from the CPU 42.

The A/D converter 20 converts analog image signals outputted from the analog signal processing section 18 into digital image signals.

The image input controller 22 has a built-in buffer memory of a predetermined capacity so as to accumulate image signals outputted from the A/D converter 20 by one frame to store the signals in the RAM 46 under the control of the CPU 42.

FIG. 2 is a block diagram showing the configuration of the digital signal processing section 24.

As shown in the figure, the digital signal processing section 24 includes an offset correcting circuit 24A, a gain correcting circuit 24B, a gamma correcting circuit 24C, a synchronizing circuit 24D, an RGB/YC converting circuit 24E, a noise filtering circuit 24F, a contour correcting circuit 24G, a color difference matrix circuit 24H, and a white balance gain calculating circuit 24I. The digital signal processing section 24 generates a YC signal consisting of a luminance signal (Y) and color difference signals (Cr, Cb) by performing a predetermined signal process on image signals (R, G, and B RAW data) stored in the RAM 46 under the control of the CPU 42. Specifically, the YC signals (YC data) are generated as shown below.

The R, G, and B image signals stored in the RAM 46 (R, G, and B signals) are sequentially taken into the digital signal processing section 24 in accordance with the color filter array of the CCD 14.

First, the R, G, and B signals taken in the digital signal processing section 24 are provided for the offset correcting circuit 24A. The offset correcting circuit 24A offsets the R, G, and B signals inputted so as to equalize the black levels.

The offset R, G, and B signals are provided for the gain correcting circuit 24B. The gain correcting circuit 24B performs gain correction on the inputted R, G, and B signals to perform white balance (WB) correction. Since the gain correcting circuit 24B is provided with WB gains Rg, Gg, and Bg for respective R, G, and B signals that are determined by the WB gain calculating circuit 24I, it performs the gain correction on the inputted R, G, and B signals with the corresponding WB gains Rg, Gg, and Bg.

The gain corrected R, G, and B signals are provided for the gamma correcting circuit 24C. The gamma correcting circuit 24C performs the gamma correction on the inputted R, G, and B signals to perform gray scale conversion.

The gamma corrected R, G, and B signals are provided for the synchronizing circuit 24D. The synchronizing circuit 24D synchronizes the R, G, and B signals by interpolating spatial differences of the R, G, and B signals attributed to the color filter array of a single plate CCD.

The synchronized R, G, and B signals are provided for the RGB/YC converting circuit 24E. The RGB/YC converting circuit 24E converts the synchronized R, G, and B signals into the luminance signal Y and the color difference signals Cr/Cb.

The generated luminance signal Y is outputted to the contour correcting circuit 24G through the noise filtering circuit 24F, whereas the generated color difference signals Cr/Cb are outputted to the color difference matrix circuit 24H through the noise filtering circuit 24F.

The contour correcting circuit 24G performs a process of highlighting a contour part (part with large variation in luminance) on the luminance signal Y inputted. The color difference matrix circuit 24H performs necessary matrix conversion on the inputted color difference signals Cr/Cb to realize good color reproducibility.

As described above, the digital signal processing section 24 generates the luminance signal (Y) and the color difference signals (Cr, Cb) by performing predetermined signal processing on the R, G, and B image signals (R, G, and B signals) taken from the RAM 46.

When a through-the-lens image (synonymous with the live images) is to be displayed on the image displaying section 30, the CCD 14 serially captures images and serially processes the captured image signals to serially generate the YC signals. The generated YC signals are provided for the display controlling section 28 via the RAM 46, and converted into a display signal format and outputted to the image displaying section 30 by the display controlling section 28. As a result, the through-the-lens image is displayed on the image displaying section 30.

When an image is to be recorded, in response to an image pickup instruction from the shutter button, the CCD 14 captures an image of one frame and processes the captured image signals to generate the YC signals for one frame. The generated YC signals are provided for the compression and decompression processing section 32 via the RAM 46, and compressed in a predetermined compression format (for example, JPEG) and stored into the RAM 46 by the compression and decompression processing section 32. Then, the YC signals are made into an image file of a predetermined file format (for example, Exif) and stored into the storage medium 36 via the media controller 34.

The YC data may be recorded without being compressed. In such a case, the YC data generated without being subjected to the compression process is made into an image file in a predetermined file format and stored into the storage medium 36.

The R, G and B image signals that are outputted from the CCD 14 and digitized (so-called RAW data) may also be recorded as they are. In such a case, the R, G, and B image signals are made into an image file in a predetermined file format without being subjected to the conversion process into the YC signals and stored into the storage medium 36.

In response to a reproduction instruction, the images stored in the storage medium 36 as described above are read out from the storage medium 36, made into the YC signals without being compressed at the compression and decompression processing section 32 (if the image data of the image to be reproduced is the compressed image data), and outputted to the image displaying section 30 via the display controlling section 28. As a result, the images recorded in the storage medium 36 is reproduced and displayed on the image displaying section 30.

The AE detecting section 38 calculates integrated values for the image signals for each area required for AE (Auto Exposure) control from the image signals stored in the RAM 46. That is, the AE detecting section 38 divides a screen into a plurality of areas (in this example, 8×8) and calculates the integrated values for the image signals for each of the resultant areas. Information on the resultant integrated values for the image signals for each area is outputted to the CPU 42. The CPU 42 calculates an EV value required for the AE control based on the information on the integrated value obtained from the AE detecting section 38 and information on the aperture value and shutter speed in taking the image signals. Then, the exposure for the main photographing is determined based on the obtained EV value. For example, the exposure (aperture, shutter speed) for the main photographing is determined from the obtained EV value according to a prepared program chart.

The AF detecting section 40 calculates an AF evaluation value required for AF (Auto Focus) control from the R, G, and B image signals. That is, the digital camera 10 of the embodiment performs the AF control by so-called contrast AF, and the AF detecting section 40 calculates the AF evaluation value indicative of sharpness of an image from the inputted image signals. The resultant AF evaluation value is outputted to the CPU 42. The CPU 42 controls the position of the focus lens 12*f* so that the AF evaluation value obtained from the AF detecting section 40 is the local maximum. For example, the CPU 42 moves the focus lens 12*f* from the nearest position to infinity by predetermined step and obtains the AF evaluation value at each position. Then, the CPU 42 detects the position at which the AF evaluation value is the local maximum, and moves the focus lens 12*f* to the detected position.

The face detecting section 52 detects the face of the object (person) contained in the image taken, and outputs information on the position and size of the face to the CPU 42.

Since the face detecting technique is well-known, the detailed description of the technique will be omitted; though, a method for detecting a face area by checking a correlation between the image taken and a face image template may be used. The method is for checking a correlation between the image taken and the face image template by inching (scanning) a face detection frame in the screen so as to recognize the region of the face detection frame for which a correlation score exceeds a threshold as the face area. The method is repeatedly implemented with the face detection frame narrowed stepwise. Since the face detecting technique has various modes other than the above-described method (for example, face detection by edge detection or shape pattern detection, face detection by hue detection or skin color detection, and the like), the optimum mode may be properly selected and used.

The information on the face area detected by the face detecting section 52 (the information indicative of the size and position of the face area) is outputted to the CPU 42. The information on the detected face area is used for the AF control, AE control or the like as required. For example, the AF control is performed as Face AF so that the detected face area is focused on, and the AE control is performed as Face AE so that the luminance of the detected face area is appropriate for the person.

The moving body detecting section 54 extracts the region that contains movement (moving body) in the captured image and outputs information on the position and the size of the region to the CPU 42.

Since the moving body detecting technique is well-known, the detailed description of the technique will be omitted; though, a method for detecting a region that contains movement in the image (region that contains a moving body) by calculating a difference between two images that are taken at slightly different time points (for example, a difference in luminance, a difference in contour, or the like) may be used.

Other than the above-described method, the method shown below may be used as a method for detecting the quantity of movement and the direction of movement (motion vector) of the moving body.

Figure 3A:
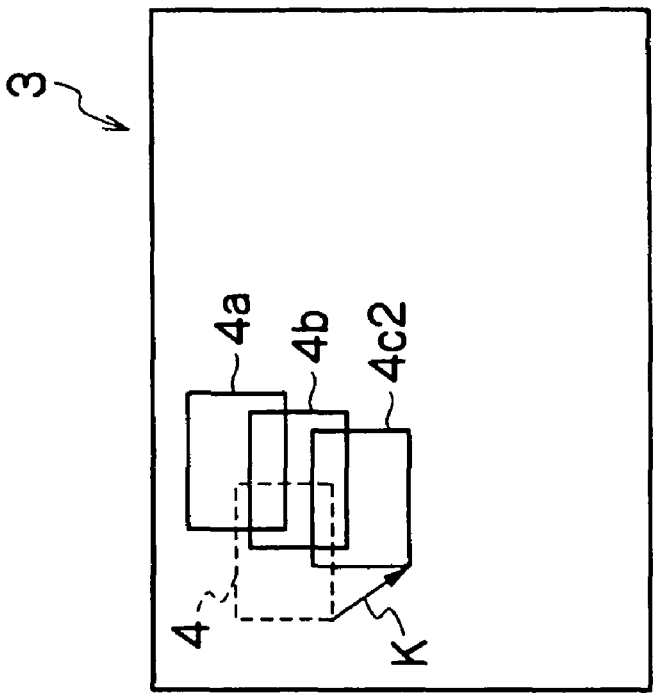
FIGS. 3A and 3B are schematic diagrams for showing the principle of motion detection.
Figure 3B:
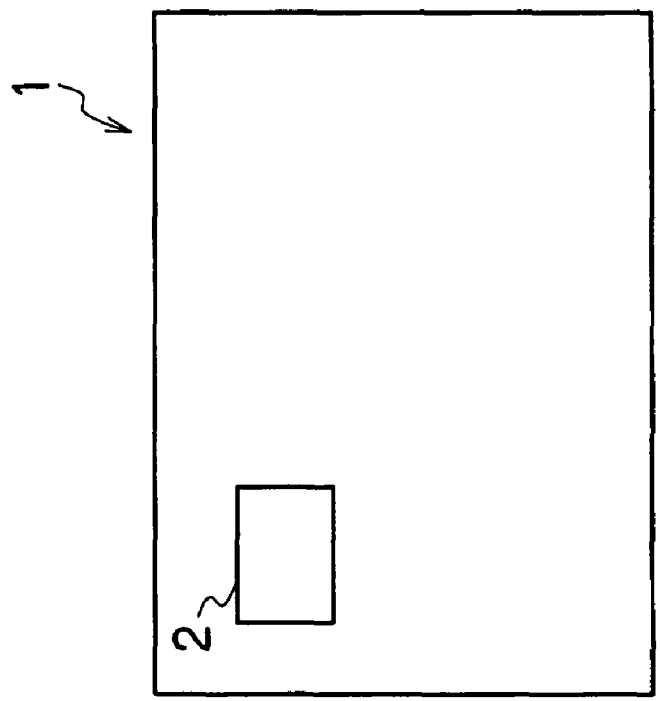

FIG. 3 is a schematic diagram for illustrating the principle of motion detection. It is assumed that the images are serially captured at certain time intervals. If the image in a block 2 that is indicated by a predetermined address in an image 1 in an $N^{th}$ frame shown in FIG. 3A is used as the reference image and if a comparative image that is cut out by a block 4 in an image 3 in an $(N+1)^{th}$ frame shown in FIG. 3B and indicated by the same address as that of the image in the block 2 is the same as the reference image, it is found that the image in the block 2 does not move.

If the image taken in the block 2 moves, the image does not stay in the block 4 in the image in the $(N+1)^{th}$ frame.

Then, the position of the block for cutting out the comparative image that is most highly correlated with the reference image is found by shifting the block 4 in the X direction (horizontal direction) and the Y direction (vertical direction) by one or several pixels like 4a, 4b, 4c, ... in the $(N+1)^{th}$ frame and comparing the respective images in the blocks 4a, 4b, 4c, ... with the reference image (image in the block 2).

If the comparative image that is most highly correlated with the reference image in the block 2 is cut out by the block 4c in the example shown in FIG. 3B, the quantity of movement and the direction of movement for the motion of the reference image in the block 2 can be indicated by the motion vector K.

Since the motion detecting technique has various modes other than the above-described method, the optimum mode may be properly selected and used.

As described later, the information on the position and size of the detected moving body is used for calculating the amount of flash emission light. That is, the digital camera 10 of the embodiment determines the amount of flash emission light in the flash photographing mode by so-called CCD light adjusting by extracting the area that contains the moving body from the taken non-flash image and flash image and calculating the amount of flash emission light based on the area that contains no moving body in either of the images. Alternatively, the digital camera 10 calculates the amount of flash emission light based on the image of the area that contains the moving body in the non-flash image and the image of the area that contains the moving body in the flash image.

Here, the moving body region (region that contains the moving body) in the image is detected by using the non-flash image and the flash image. If the through-the-lens image is captured, the detection is performed by using the captured through-the-lens image.

The dimmer 56 calculates the amount of emission of the flash device 60 in the main photographing (main emission). As described above, the dimmer 56 calculates the amount of emission by using so-called CCD light adjusting. That is, the dimmer 56 determines the amount of emission of the flash device 60 in the main photographing based on the image taken by making the flash device 60 pre-emitted in a predetermined amount of emission (flash image) and the image taken by not making the flash device 60 emitted (non-flash image). Here, the dimmer 56 determines the amount of emission by using the information on the result of the moving body detection by the moving body detecting section 54. Specifically, the dimmer 56 determines the amount of flash emission light in the main emission as shown below.

Figure 4:
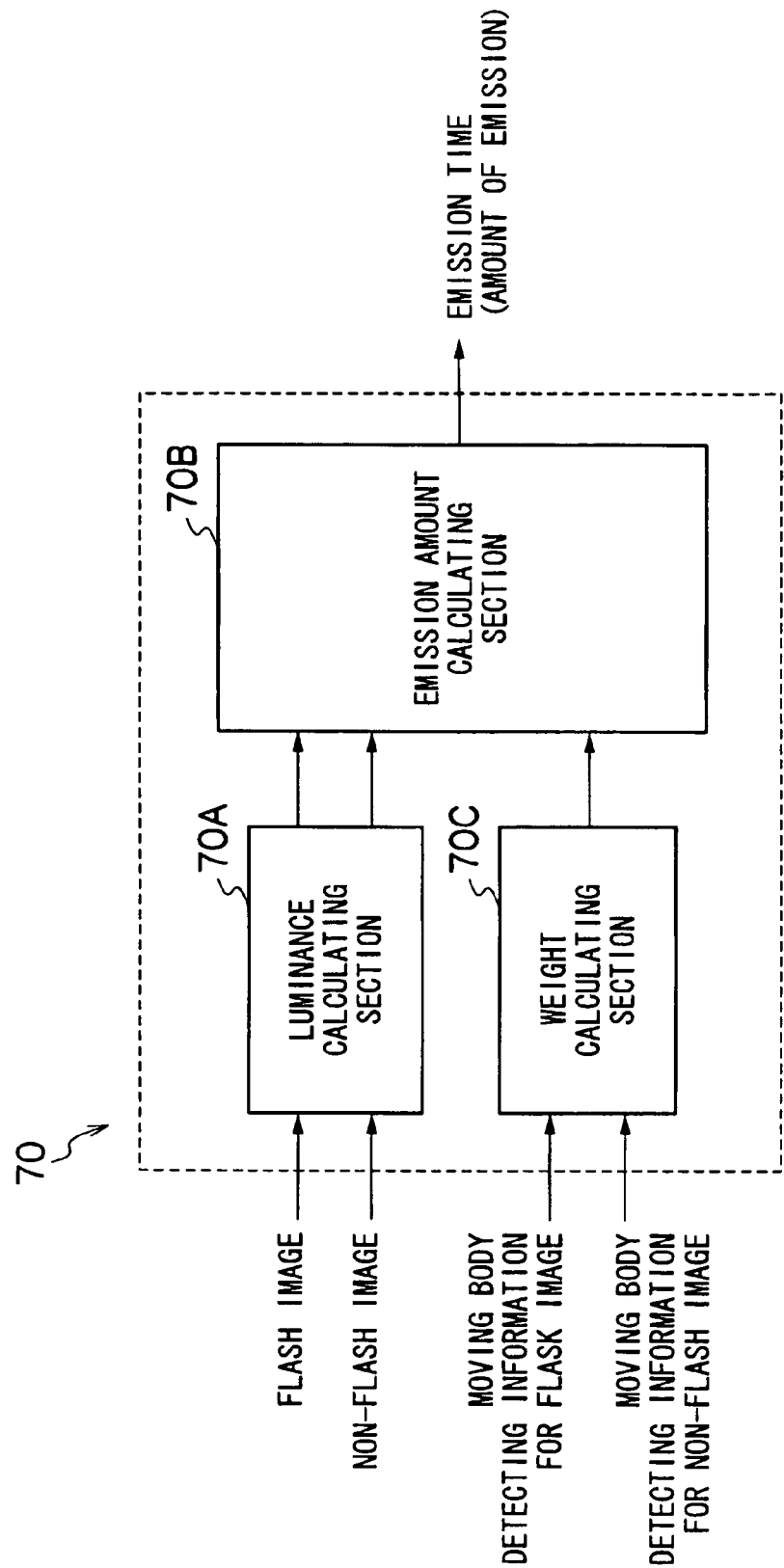
FIG. 4 is a block diagram showing a configuration of a dimmer.

As shown in FIG. 4, the dimmer 56 includes a luminance calculating section 56A, an emission amount calculating section 56B, and a weight calculating section 56C.

The luminance calculating section 56A calculates the average luminance for each area in the flash image and the non-flash image. The luminance calculating section 56A has the image signals of the flash image and the image signals of the non-flash image input. The luminance calculating section 56A divides the input flash image into a plurality of areas (in this example, 8×8) and calculates the average luminance for each of the resultant areas. Similarly, the luminance calculating section 56A divided the input non-flash image into a plurality of areas (8×8) and calculates the average luminance for each of the resultant areas. Information on the calculated average luminance for each area is outputted to the emission amount calculating section 56B.

The emission amount calculating section 56B calculates the amount of flash emission light in the main emission (emission time) based on the average luminance for each area in the flash image calculated by the luminance calculating section 56A and the average luminance for each area in the non-flash image. Specifically, the emission amount calculating section 56B calculates the amount of emission in the procedure shown below.

First, reflection luminance for each area is calculated by subtracting the average luminance for each area in the non-flash image from the average luminance for each area in the flash image.

Next, the reflection luminance is calculated by calculating a weighted mean by adding a weight calculated by the weight calculating section 56C to the obtained reflection luminance for each area. Similarly, non-flash luminance is calculated by calculating a weighted mean by adding a weight calculated by the weight calculating section 56C to the reflection luminance for each area in the non-flash image.

Next, the scale factor required to the pre-emission to make the amount of emission optimum (emission scale) is calculated by subtracting the non-flash luminance from predetermined target luminance and dividing the result by the reflection luminance (emission scale=("target luminance"−"non-flash luminance")/"reflection luminance").

The amount of emission (emission time) that satisfies the emission scale calculated in the above-described manner is obtained. Since an arc tube included in the flash device 60 has various properties, the amount of emission (emission time) is prepared in a lookup table or the like in association with the emission scale.

The weight calculating section 56C calculates the weight used by the emission amount calculating section 56B. The weight calculating section 56C receives the input of the information on the result of the moving body detection executed on the flash image that is detected by the moving body detecting section 54 and the information on the result of the moving body detection executed on the non-flash image. The weight calculating section 56C calculates the weight to be set in each area based on the input information on the result of the moving body detection executed on the flash image and the input information on the result of the moving body detection executed on the non-flash image.

Figure 5:
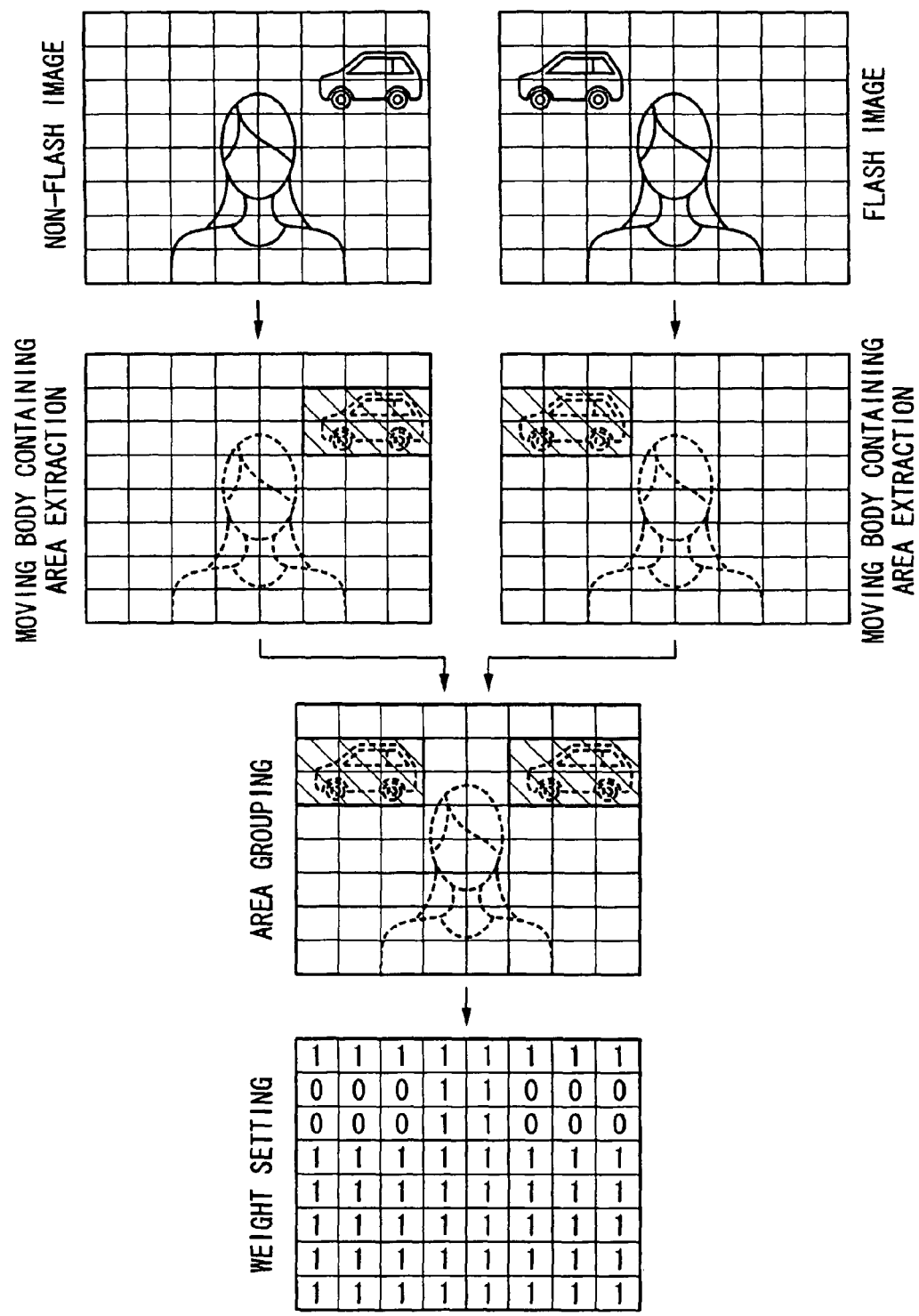
FIG. 5 is a conceptual diagram of weighing.

For example, as shown in FIG. 5, a moving body containing area is extracted from the flash image (area containing a moving body) and the moving body containing area is extracted from the non-flash image based on the input information on the result of the moving body detection executed on the flash image and the input information on the result of the moving body detection executed on the non-flash image. Then, based on the result of the extraction, the areas to be weighted are grouped into the moving body containing area and the moving body uncontaining area (the area that contains the moving body in either the flash image or the non-flash image becomes the moving body containing area, and the other areas become the moving body uncontaining area.). The areas to be weighed are the same as those to be grouped in calculating the average luminance (therefore, in the example, 8×8).

Thereafter, 0 is set to the weights to the moving body containing area grouped and 1 is set to the weights to the moving body uncontaining area grouped so that the weights to be set to respective areas are calculated by multiplying the set weights by the weighting factors for previously set areas. That is, as shown in FIG. 6, since the weighting factor is previously set to each area (the figure shows an example where weighting is performed with the center weighted), the weights set separately to the moving body containing area and the moving body uncontaining area are multiplied by the weighting factor so as to calculate the weighting factor for each area that is to be used for calculating the main emission.

The above-described weighting enables the amount of emission to be calculated by excluding information on the area containing a moving body at the time of calculating the amount of emission, and thus the amount of flash emission light can be set properly even if a moving body is in the angle of view.

Although the above-described example shows weighting is performed with the center weighted, the previously set weighting factor is not limited to that. Such weighting is also possible as the face is weighted by using the result of face detection.

If such weighting is not performed, the weights set separately to the moving body containing area and the moving body uncontaining area are set to the respective areas as final weights.

The flash controlling section 58 controls the driving (emission) of the flash device 60 in response to an instruction from the CPU 42.

The flash device 60 has, for example, a xenon tube as a light source, and also includes a main condenser and other driving circuits. The flash device 60 may also have the LED or the like as the light source.

Now, a process procedure of flash photographing by the digital camera 10 of the embodiment in the above-described configuration will be described.

Figure 7:
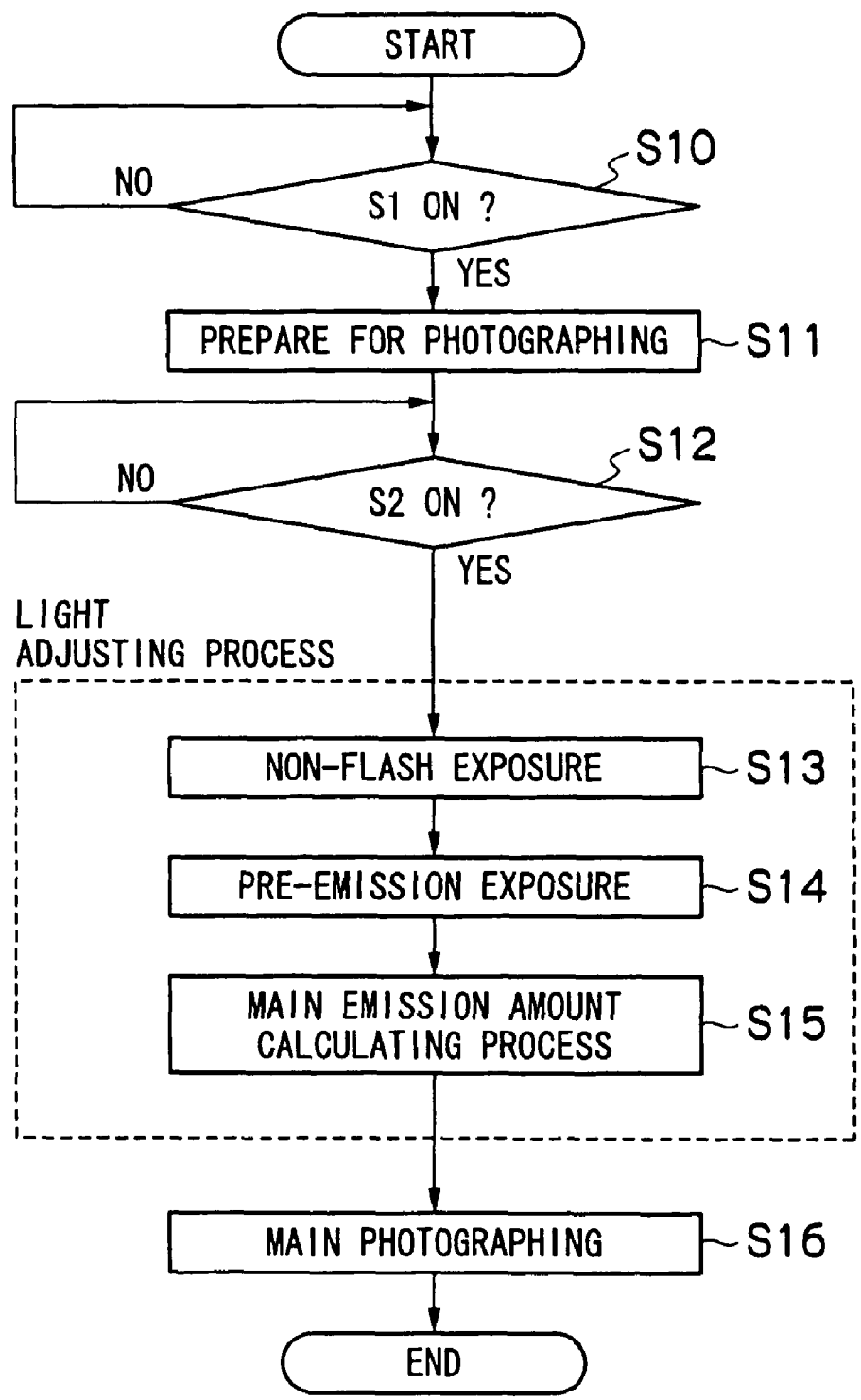
FIG. 7 is a flowchart showing a process procedure of photographing in a flash photographing mode.

FIG. 7 is a flowchart showing a process procedure of photographing in the flash photographing mode.

As mentioned above, the digital camera 10 of the embodiment executes a process of preparing photographing (AE/AF or the like) in response to half pressure of a shutter button, and executes the main photographing in response to full pressure.

First, the CPU 42 determines whether or not the shutter button is halfway pressed based on the input from the operating section 50. Since the switch S1 is turned on in response to the half pressure of the shutter button as described above, the CPU 42 determines whether the shutter button is halfway pressed or not by determining whether the switch S1 is turned on or not (step S10).

When the switch S1 is turned on, the CPU 42 executes the photographing preparing process (step S11). That is, the CPU 42 executes the AE and AF processes so as to set the exposure for the main photographing and to focus on the main object.

When the photographing preparation is completed, the CPU 42 determines whether the shutter button is fully pressed or not based on the input from the operating section 50. That is, the CPU 42 determines whether it is instructed to execute the main photographing or not. Since the switch S2 is turned on in response to the full pressure of the shutter button, the CPU 42 determines whether the shutter button is fully pressed or not by determining whether the switch S2 is turned on or not (step S12).

When the CPU 42 determines that the shutter button is fully pressed, it executes the light adjustment.

First, the CPU 42 causes the CCD 14 to be exposed with no flash emitted to obtain the non-flash image (step S13).

Next, the CPU 42 causes the CCD 14 to be exposed with the flash emitted in predetermined amount of emission light to obtain the flash image (step S14).

Then, the CPU 42 executes the process of calculating the amount of flash emission light for the main photographing (main emission) based on the obtained non-flash image and flash image (step S15).

Figure 8:
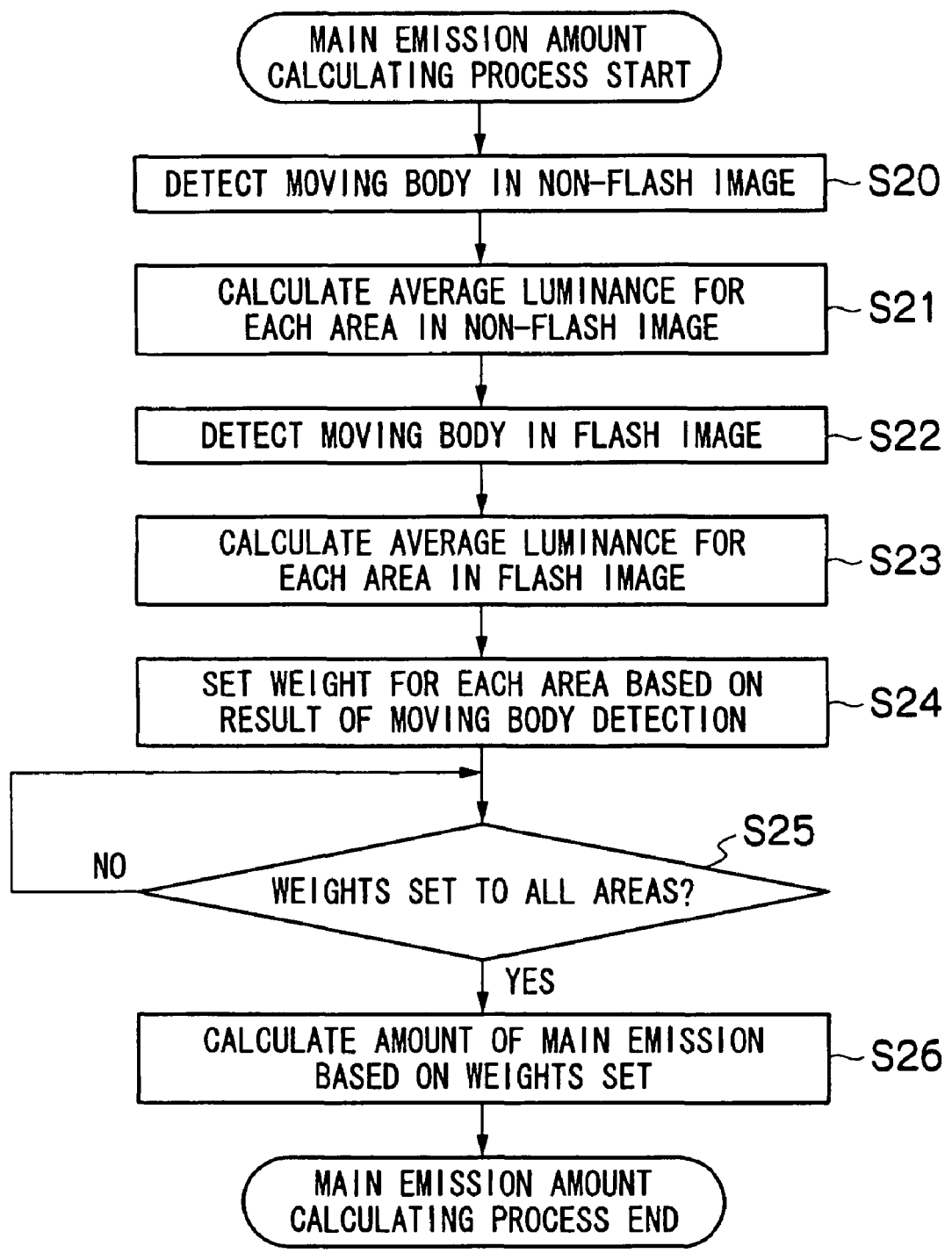
FIG. 8 is a flowchart showing a process procedure of calculating an amount of main emission based on a non-flash image and a flash image.

FIG. 8 is a flowchart showing a process procedure of calculating the amount of main emission based on the non-flash image and the flash image.

First, the process of detecting a moving body from the obtained non-flash image is executed (step S20). That is, the moving body detecting section 54 detects the position and size of the moving body contained in the non-flash image.

Since the moving body detection here is executed by comparing the non-flash image with the through-the-lens image that is obtained immediately before the non-flash image is obtained, the through-the-lens image obtained immediately before the non-flash image is obtained as well as the non-flash image are provided for the moving body detecting section 54 so that the position and size of the moving body contained in the non-flash image are detected.

Information on the detected position and size of the moving body is outputted to the CPU 42, which in turn provides the obtained information for the dimmer 56.

Next, the process of calculating the average luminance for each area from the obtained non-flash image is executed (step S21). That is, the dimmer 56 divides the non-flash image into a plurality of areas (in the example, 8×8 areas) and calculates the average luminance for each of the resultant areas.

Next, the process of detecting a moving body from the obtained flash image is executed (step S22). That is, the moving body detecting section 54 detects the position and size of the moving body contained in the flash image.

Since the moving body detection here is executed by comparing the flash image with the non-flash image, the non-flash image and the flash image are provided for the moving body detecting section 54 so that the position and size of the moving body contained in the flash image are detected. Alternatively, since the moving body detection is executed by comparing the flash image with the through-the-lens image that is obtained immediately before the non-flash image is obtained, the through-the-lens image obtained immediately before the non-flash image is obtained as well as the flash image are provided for the moving body detecting section 54 so that the position and size of the moving body contained in the flash image are detected.

The information on the detected position and size of the moving body is outputted to the CPU 42, which in turn provides the obtained information for the dimmer 56.

Next, the process of calculating the average luminance for each area from the obtained flash image is executed (step S23). That is, the dimmer 56 divides the flash image into a plurality of areas (in the example, 8×8 areas) and calculates the average luminance for each of the resultant areas.

Next, the weight calculating section 56C of the dimmer 56 executes a process of setting the weights required for calculating the amount of emission for the main emission based on the information on the result of the moving body detection in the non-flash image and the information on the result of the moving body detection in the flash image (step S24). That is, the weighting factors to be set to the respective areas are calculated so that the amount of emission can be obtained based on the image of the area that contains no moving body in either the non-flash image or the flash image (so that the amount of emission for the main emission can be obtained based on the regions of the images other than the regions that contain the moving body).

If no moving body is detected in both of the images, the weighting factors to be set in the respective areas are calculated as usual so that the amount of emission can be obtained from the entire screen.

The CPU 42 determines whether the weighting factors for all the areas have been set or not (step S25), and when it determines that the weighting factors for all the areas have been set, it causes the emission amount calculating section 56B of the dimmer 56 to execute the process of calculating the amount of flash emission light for the main photographing (the amount of main emission) by using the weighting factors set (step S26).

In that case, first, the reflection luminance for each area is calculated by subtracting the average luminance for each area in the non-flash image from the average luminance for each area in the flash image. Then, the reflection luminance is calculated by calculating a weighted mean by adding a weight calculated by the weight calculating section 56C to the obtained reflection luminance for each area. Similarly, the non-flash luminance is calculated by calculating a weighted mean by adding a weight calculated by the weight calculating section 56C to the reflection luminance for each area in the non-flash image. Then, the emission scale is calculated by subtracting the non-flash luminance from predetermined target luminance and dividing the result by the reflection luminance, and the amount of emission (emission time) that satisfies the calculated emission scale is obtained.

The computing process for the amount of main emission has been completed. The dimmer 56 outputs information on the calculated amount of main emission to the CPU 42.

Thereafter, the CPU 42 executes the main photographing process by causing the flash device 60 to emit a light in the obtained amount of emission as shown in FIG. 6 (step S16). That is, the CPU 42 instructs the flash controlling section 58 to cause the flash device 60 to emit a light in the obtained amount of emission, and causes the flash to be emitted in synchronization with exposure of the CCD 14. Then, the CPU 42 records the obtained image in the storage medium 36.

Since the digital camera 10 of the embodiment obtains the amount of emission for the main emission based on the regions of the images other than the regions that contain the moving body, in obtaining the amount of flash emission light (amount of main emission) in the main photographing, it can cause the flash to emit a light in the proper amount of emission even if a moving body is in the angle of view. Accordingly, the digital camera 10 can provide a good image.

Although 0 is set to the weight to the moving body containing area and 1 is set to the weight to the moving body uncontaining area when the weights are set separately to the moving body containing area and the moving body uncontaining area in the above-described example, the weights to be set to the respective areas are not limited to them. Influence of the moving body can be eliminated at least by setting the weight to the moving body containing area lower than that to the moving body uncontaining area. Accordingly, 1 may also be set to the weights to the moving body uncontaining area and 0.5 may also be set to the weights to the moving body containing area.

Although the non-flash image is obtained prior to the flash image in executing the light adjustment process in the above-described example, the order to obtain the flash image and the non-flash image is not limited to that and the flash image may be obtained prior to the non-flash image.

Since neither the order to execute the moving body detection nor the order to calculate the average luminance may not be limited to the embodiment, the calculations of the moving body detection and the average luminance may be executed for the flash image first.

Although the above-described example exemplifies the method for detecting the position and size of the moving body contained in the non-flash image by comparing the non-flash image with the through-the-lens image that is obtained immediately before the non-flash image is obtained as the method for detecting the position and size of the moving body contained in the non-flash image, the method is not limited to that. For example, the position and size of the moving body contained in the non-flash image and the flash image may be detected by comparing the non-flash image with the flash image.

The number of image to be compared with is not limited to one, and the moving body contained in the image can be detected based on a plurality of images. For example, when the moving body contained in the non-flash image is to be detected, the detection can be executed by taking account of a plurality of through-the-lens images that are obtained immediately before the non-flash image is obtained. Similarly, when the moving body contained in the flash image is to be detected, the detection can be executed by taking account of a plurality of through-the-lens images that are obtained immediately before the non-flash image is obtained and the non-flash image.

Also, calculation of the average luminance may be executed prior to the moving body detecting process.

Although the dimmer 56 is adapted to calculate the average luminance for each area by itself in the embodiment, it may execute the calculation by using the detection results from the AE detecting section 38.

Although the light adjusting process is executed by using the exclusive hardware circuit (dimmer) in the embodiment, it may be processed by software that realizes the same function.

Although the angle of view is divided into a plurality of areas so that the presence of the moving body is determined for each area in the embodiment, the moving body may be extracted so that the amount of main emission is calculated based on the regions of the images other than the regions that contain the moving body.

Second Embodiment

Now, the second embodiment of the flash emission method according to the present invention will be described.

Since the second embodiment is different from the first embodiment only by a process procedure of calculating the amount of main emission, only the process procedure will be described here.

Figure 9:
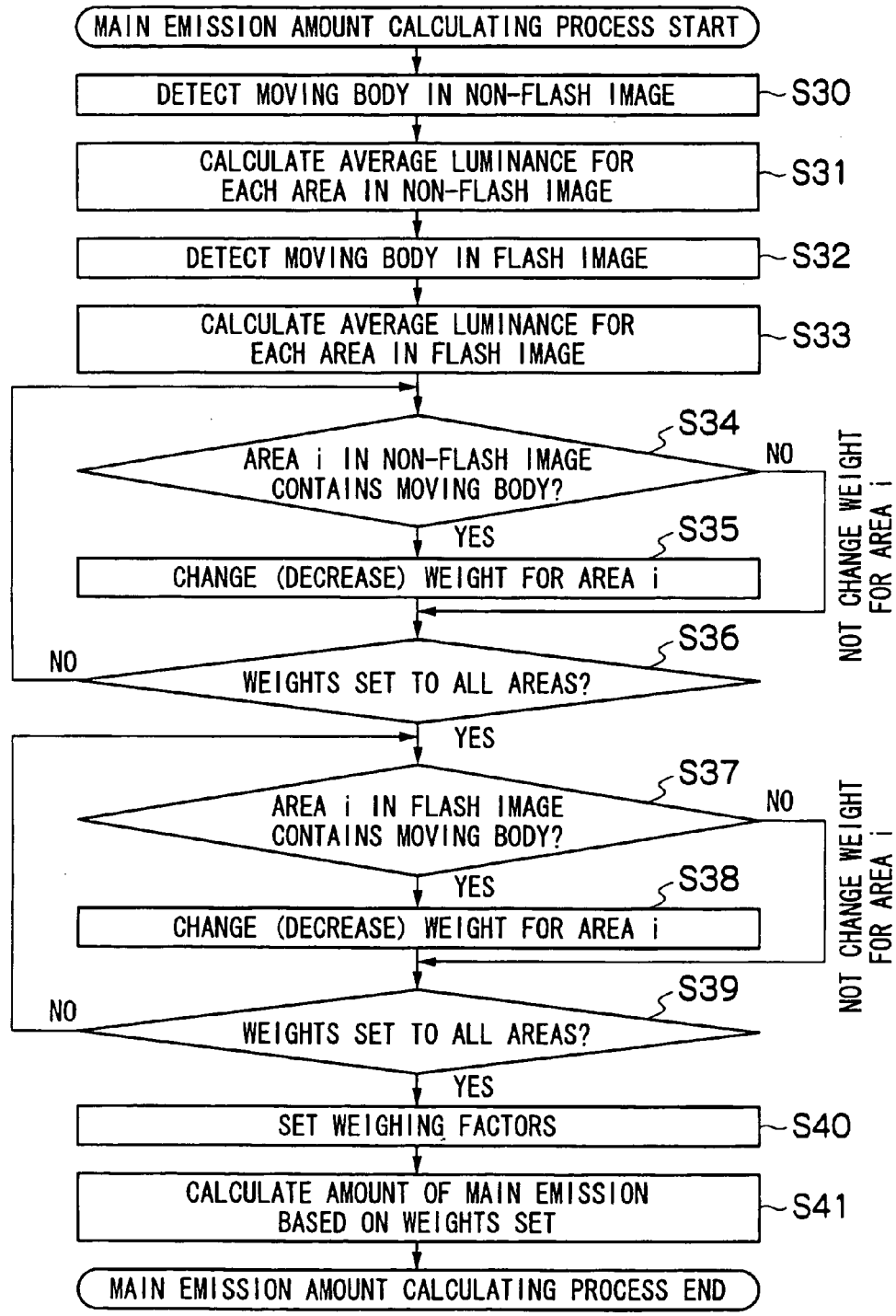
FIG. 9 is a flowchart showing a second embodiment of the process procedure of calculating the amount of main emission.

FIG. 9 is a flowchart showing the second embodiment of the process procedure of calculating the amount of main emission.

The embodiment is the same as the first embodiment in that the non-flash image and the flash image are obtained prior to the process of calculating the amount of main emission (see FIG. 7).

First, a process of detecting the moving body from the obtained non-flash image is executed (step S30). The moving body detection is executed here by comparing the non-flash image with the through-the-lens image obtained immediately before the non-flash image is obtained, for example, as in the above-described embodiment. The information on the position and size of the detected moving body is outputted to the CPU 42, which in turn provides the obtained information for the dimmer 56.

Next, the process of calculating the average luminance for each area from the obtained non-flash image is executed (step S31).

Next, the process of detecting the moving body from the obtained flash image is executed (step S32). The moving body detection is executed here by comparing the flash image with the non-flash image or the through-the-lens image obtained immediately before the non-flash image is obtained, for example, as in the above-described embodiment. The information on the detected position and size of the moving body is outputted to the CPU 42, which in turn provides the obtained information for the dimmer 56.

Next, the process of calculating the average luminance for each area from the obtained flash image is executed (step S33).

Next, as shown in FIG. 10A, the presence of the moving body is determined for each of the areas divided (for each of the areas divided for calculating the average luminance for each area) in the non-flash image based on the information on the result of moving body detection (step S34). Then, the weights are changed for the area that contains a moving body (step S35), whereas the weights are left as they are (unchanged) for the area that contains no moving body.

It is assumed that 1 is initially set to the weights to all areas, and the weights are changed to 0 for the area that contains a moving body (moving body containing area) in the embodiment. Accordingly, the weights to the area that contains no moving body (moving body uncontaining area) remain 1. If no moving body is in the angle of view, 1 is set to the weights to all areas.

Setting 0 to the weights to the area that contains a moving body and 1 to the weights to the area that contains no moving body, instead of changing the weights, may also provide the same effect.

The CPU 42 determines whether or not the weights to all areas have been set for the non-flash image (step S36). When the CPU 42 determines that the weights to all areas have been set, it executes the weight setting process on the flash image. That is, as shown in FIG. 10B, the CPU 42 determines the presence of the moving body for each of the areas divided (for each of the areas divided for calculating the average luminance for each area) based on the information on the moving body detection result for the flash image (step S37), and executes the process of changing the weights to the area that contains a moving body (step S38).

Also for the flash image, 1 is initially set to the weights to all areas, and the weights are changed to 0 for the area that contains the moving body.

The CPU 42 determines whether or not the weights to all areas have been set for the flash image (step S39). When the CPU 42 determines that the weights to all areas have been set, it executes the process of setting the weighting factors to be given to the respective areas (step S40).

Figure 11:
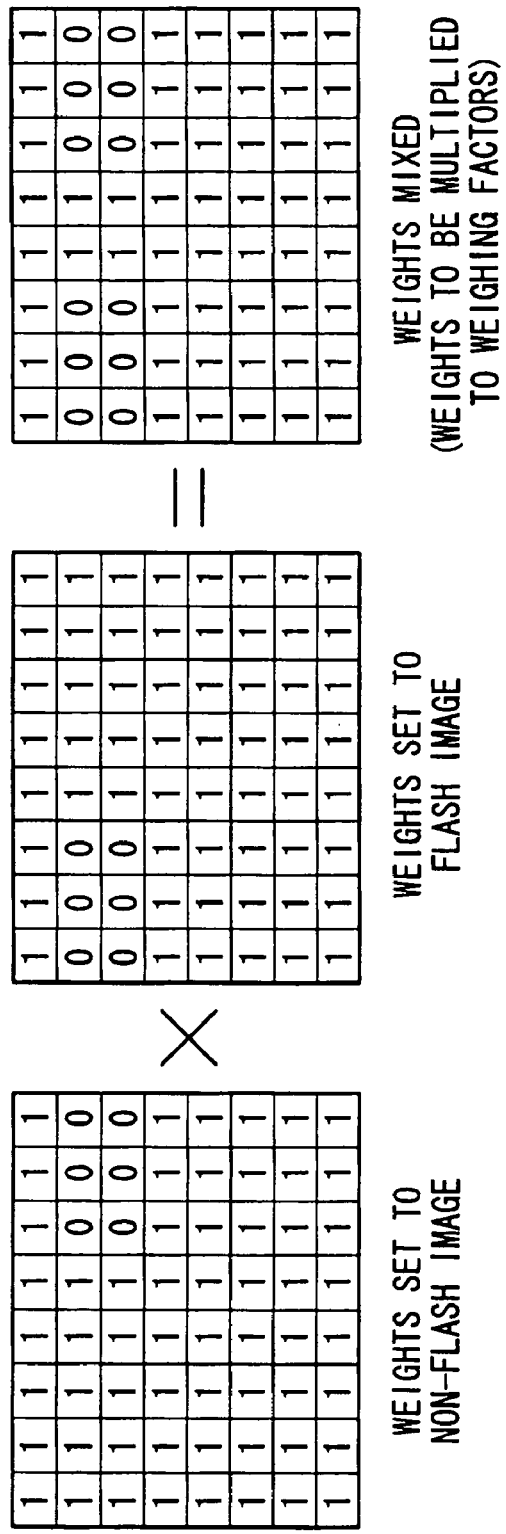
FIG. 11 is a block diagram showing a configuration of a dimmer when the amount of main emission is calculated by a method of the embodiment.

First, the CPU 42 mixes the weights set for the non-flash image and the weights set for the flash image to calculate the weights to be set to the respective areas (=the weights to be multiplied by the weighting factor previously set for each area). Here, as shown in FIG. 11, the CPU 42 calculates the weights to the respective area by multiplying the weights set for the non-flash image by the weights set for the flash image.

Then, the CPU 42 calculates the weighting factors to be used for calculating the amount of main emission by multiplying the weight for each area that is calculated in the above-described manner by the weighting factor previously set for each area (see FIG. 6).

Thereafter, the CPU 42 causes the emission amount calculating section 56B of the dimmer 56 to execute the calculating process of the amount of flash emission light for the main photographing (amount of main emission) by using the calculated weighting factors (step S41).

As such, the way of calculating the amount of main emission according to the embodiment also enables the amount of emission to be properly set by eliminating the influence of the moving body so that a good image is photographed.

Although 0 is set to the weights to the moving body containing area in the above-described example, the weights to the moving body containing area only need to be set at least lower than the weights to the moving body uncontaining area. Accordingly, 0.5 may also be set to the weights to the moving body containing area and 1 may be set to the weights to the moving body uncontaining area.

Although the weight to be set to each area (=the weight to be multiplied by the weighting factor previously set for each area) is calculated by multiplying the weight set to the non-flash image by the weight set to the flash image in the above-described embodiment, the way of calculating the weight to be set to each area is not limited to that. The weight to be set to each area may be calculated by adding the weight set to the non-flash image and the weight set to the flash image for each area and then multiplying the result by ½ for each area.

Third Embodiment

In the above-described first and second embodiments, the amount of flash emission light for the main photographing (the amount of main emission) is calculated based on the images other than those for the area that contain the moving body, if the angle of view contains a moving body. That way is effective when something other than the main object (for example, the background) is moving.

On the other hand, when the main object is moving, the way of calculating the amount of main emission based on the image for the area that contains the moving body (the image of the moving body) enables the main object to be photographed with more proper brightness.

Therefore, in the embodiment, the amount of main emission is calculated based on the image of the moving body in the angle of view.

Figure 12:
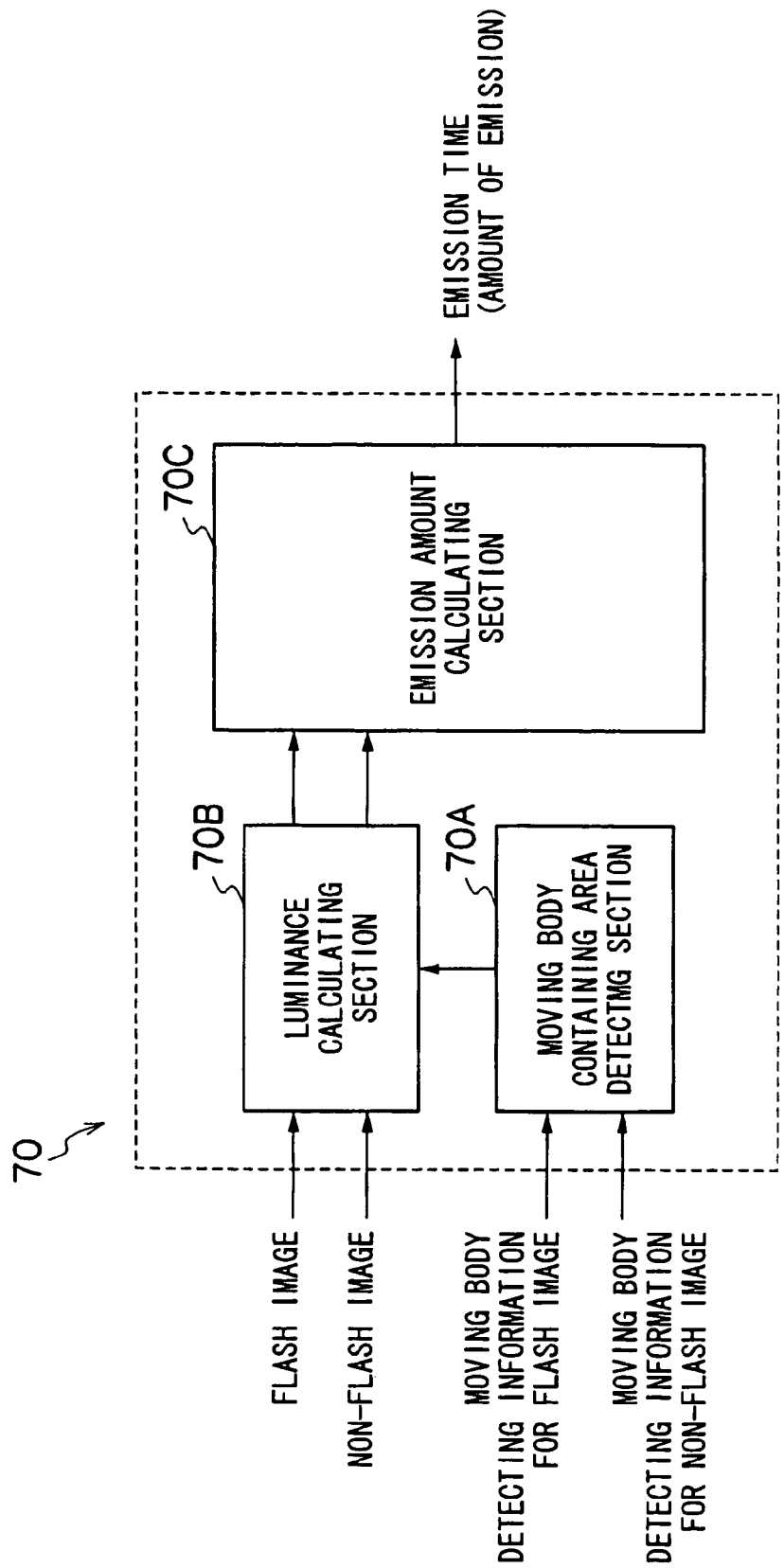
FIG. 12 is a block diagram showing a configuration of the dimmer.

FIG. 12 is a block diagram showing the configuration of the dimmer when the amount of main emission is calculated by the method according to the embodiment.

As shown in the figure, the dimmer 70 of the embodiment includes a moving body containing area detecting section 70A, a luminance calculating section 70B, and an emission amount calculating section 70C.

The moving body containing area detecting section 70A divides the image into a plurality of areas, and detects (extracts) the area that contains the moving body (moving body containing area) based on the result of moving body detection by the moving body detecting section 54. Here, the image is divided into 8×8 areas for detecting the moving body containing area. Information on the detection by the moving body containing area detecting section 70A is outputted to the luminance calculating section 70B.

The luminance calculating section 70B calculates the average luminance for the moving body containing area based on the result of the moving body containing area detection by the moving body containing area detecting section 70A. Information on the average luminance for the moving body containing area calculated by the luminance calculating section 70B is outputted to the emission amount calculating section 70C.

The emission amount calculating section 70C calculates the amount of main emission based on the average luminance for the moving body containing area in the non-flash image and the average luminance for the moving body containing area in the flash image that are calculated by the luminance calculating section 70B. For example, the emission amount calculating section 70C calculates the amount of emission (emission time) in the procedure shown below.

First, the reflection luminance is calculated by subtracting the average luminance for the non-flash image from the average luminance for the flash image. Next, the scale factor required to the pre-emission to make the amount of emission optimum (emission scale) is calculated by subtracting the non-flash luminance (the average luminance for the non-flash image) from predetermined target luminance and dividing the result by the reflection luminance. The amount of emission (emission time) that satisfies the emission scale calculated in the above-described manner is obtained. Since the arc tube included in the flash device 60 has various properties, the amount of emission (emission time) is prepared in a lookup table or the like in association with the emission scale.

Now, the flash emission method according to the embodiment will be described.

Since the third embodiment is different from the first embodiment only by the process procedure of calculating the amount of main emission, only the process procedure will be described here.

Figure 13:
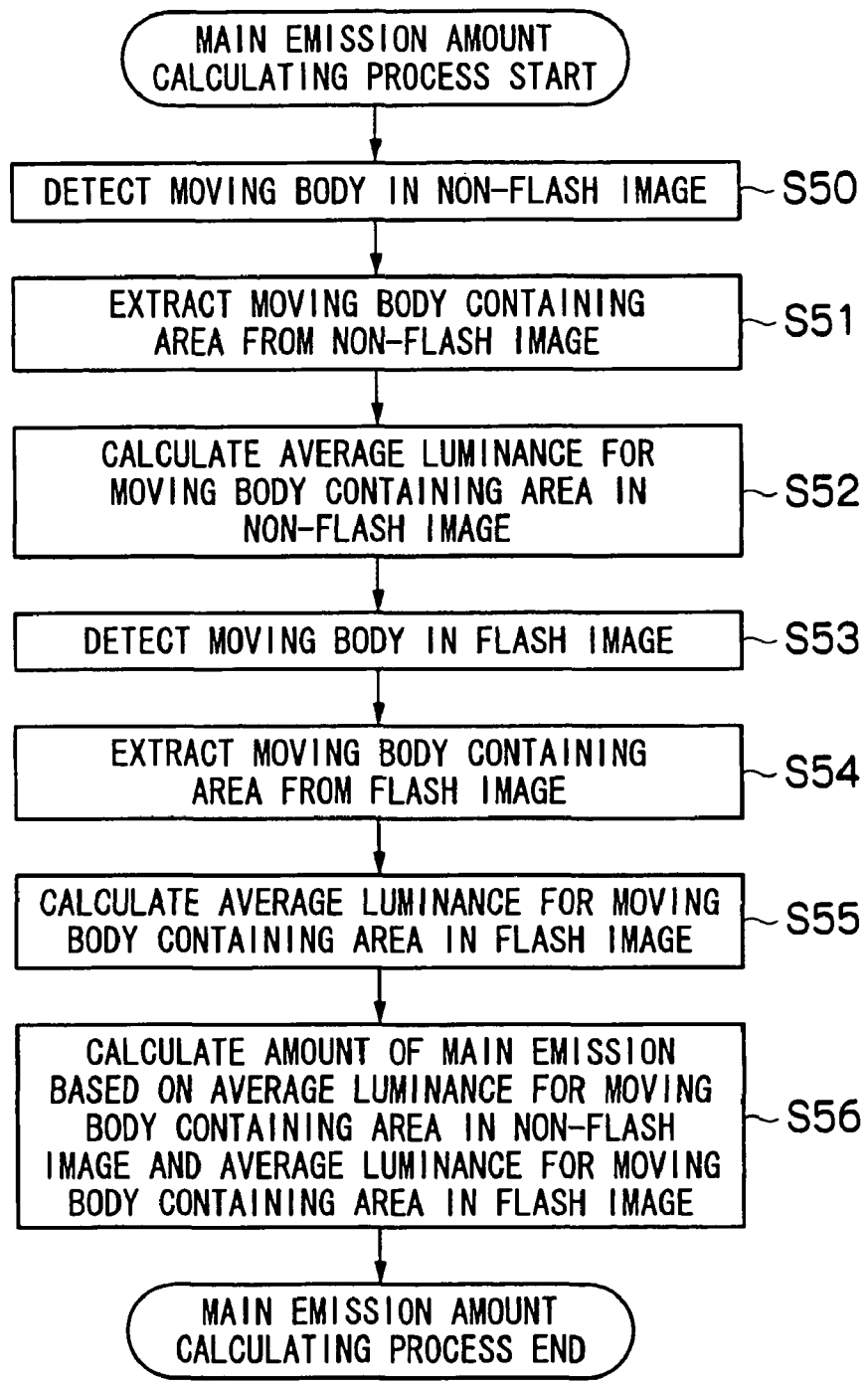
FIG. 13 is a flowchart showing a third embodiment of the process procedure of calculating the amount of main emission.

FIG. 13 is a flowchart showing the third embodiment of the process procedure of calculating the amount of main emission.

The process procedure is the same as that of the first embodiment in that the non-flash image and the flash image are obtained prior to the process of calculating the amount of main emission (see FIG. 7).

First, a process of detecting the moving body from the non-flash image is executed (step S50). That is, the moving body detecting section 54 extracts the moving body from the non-flash image and detects the position and size. The moving body detection here is executed, for example, by comparing the non-flash image with the through-the-lens image that is obtained immediately before the non-flash image is obtained, as in the above-described embodiments. The information on the detected position and size of the moving body is outputted to the CPU 42, which in turn provides the obtained information for the dimmer 70.

Figure 14:
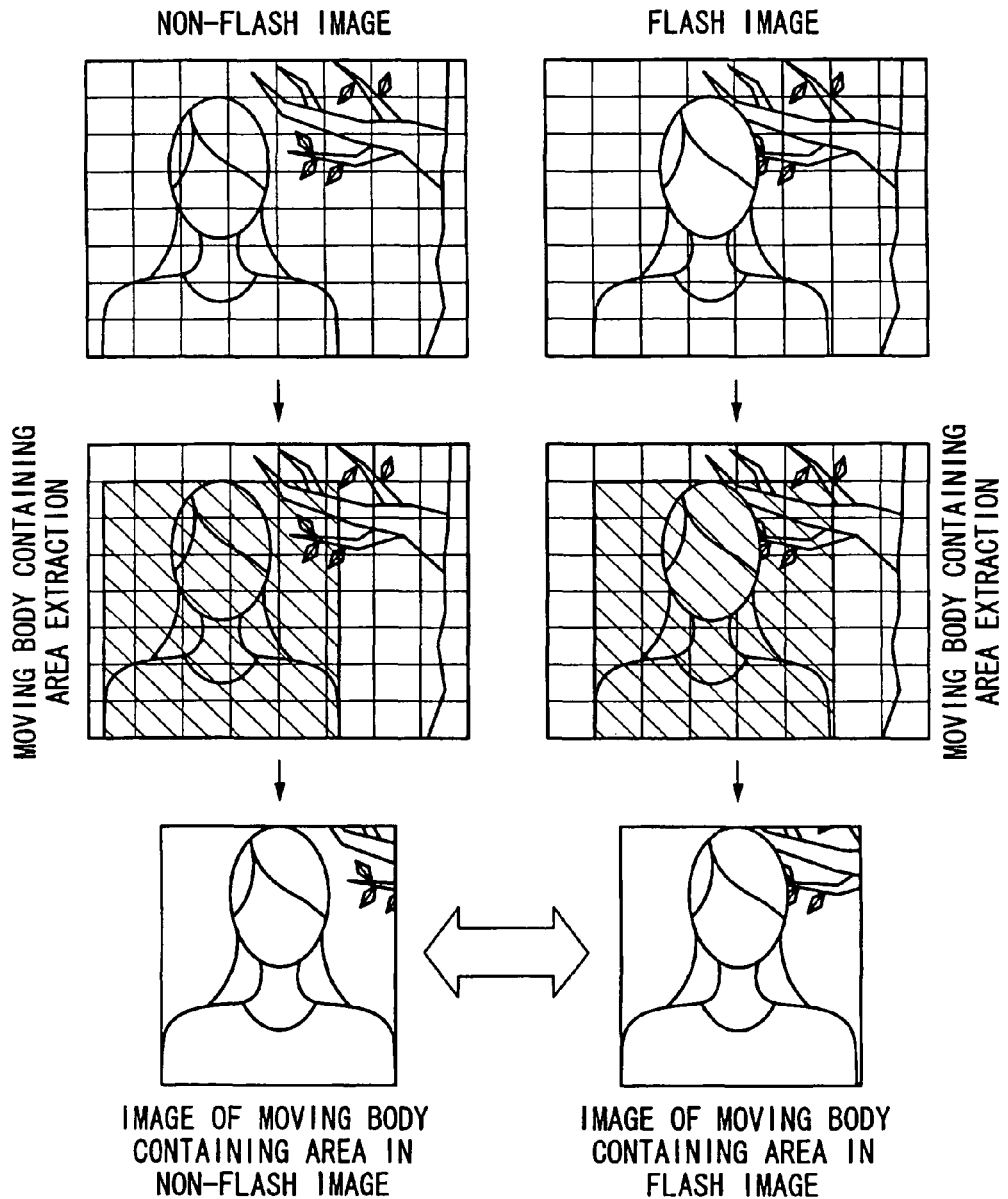
FIGS. 14A and 14B are conceptual diagrams of weighing.

The dimmer 70 executes the process of detecting the moving body containing area based on the result of moving body detection in the obtained non-flash image, as shown in FIG. 14A (step S51). That is, the dimmer 70 causes the moving body containing area detecting section 70A to divide the non-flash image into a plurality of areas and detect the area that contains the moving body (moving body containing area). Information on the moving body containing area detected by the moving body containing area detecting section 70A is provided for the luminance calculating section 70B, which in turn calculates the average luminance for the detected moving body containing area in the non-flash image (step S52). The calculated average luminance for the moving body containing area in the non-flash image is provided for the emission amount calculating section 70C.

When the average luminance for the moving body containing area has been calculated for the non-flash image, then the moving body detecting process is executed for the flash image (step S53). The moving body detection here is executed by comparing the non-flash image with the through-the-lens image obtained immediately before the non-flash image is obtained, for example, as in the above-described embodiments. The information on the position and size of the detected moving body is outputted to the CPU 42, which in turn provides the obtained information for the dimmer 70.

The dimmer 70 detects the moving body containing area in the flash image based on the result of moving body detection in the obtained flash image, as shown in FIG. 14B (step S54). Then, the dimmer 70 causes the luminance calculating section 70B to calculate the average luminance for the detected moving body containing area in the flash image (step S55). The calculated average luminance for the moving body containing area in the non-flash image is provided for the emission amount calculating section 70C.

When the average luminance for the moving body containing area in the non-flash image and the average luminance for the moving body containing area in the flash image are calculated as described above, the emission amount calculating section 70C calculates the amount of flash emission light for the main photographing (the amount of main emission) based on the average luminance for the moving body containing area in the non-flash image and the average luminance for the moving body containing area in the flash image (step S56).

Since the amount of main emission is calculated in the above-described manner based on the moving body image in the embodiment, the amount of flash emission light can be properly set so that a good image can be captured even if the main object is moving.

Although the angle of view is divided into a plurality of areas so that the presence of the moving body is determined for each area in the above-described embodiments, the moving body may be extracted so that the amount of main emission is calculated based on the regions of the images other than the regions that contain the moving body.

The embodiment is the same as the above-described first embodiment in that the order to obtain the non-flash image and the flash image, the order to detect the moving body containing area from the non-flash image and the flash image, and the like are not limited to those described above.

The embodiment is the same as the above-described first embodiment also in that the process executed by the dimmer 70 may be processed by software.

Fourth Embodiment

Another embodiment for calculating the amount of main emission based on an image of a moving body in the angle of view will be described.

The configuration of the dimmer is the same as that in the third embodiment.

Figure 15:
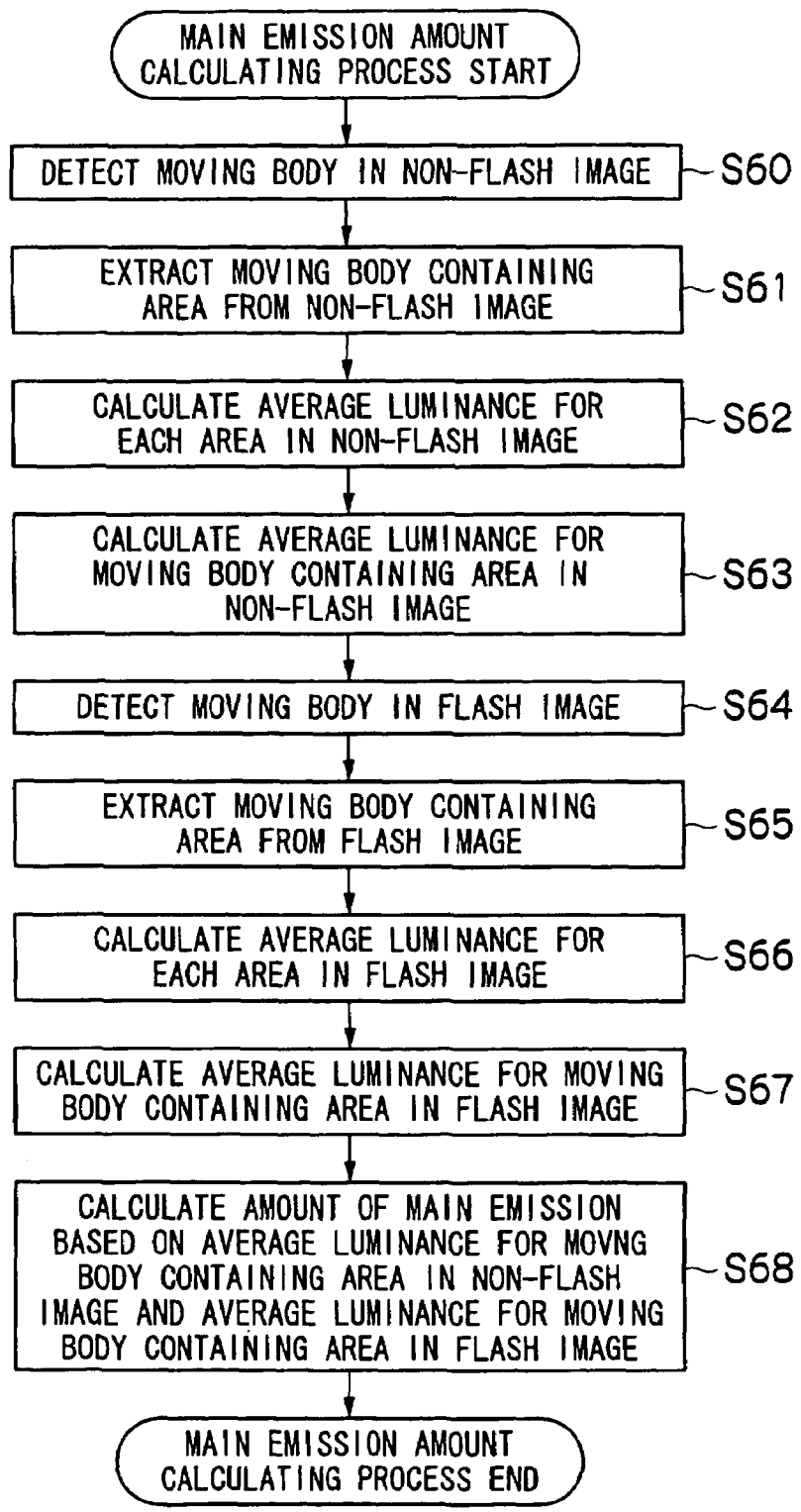
FIG. 15 is a flowchart showing a fourth embodiment of the process procedure of calculating the amount of main emission.

FIG. 15 is a flowchart showing the fourth embodiment of the process procedure of calculating the amount of main emission.

The embodiment is the same as the third embodiment in that the non-flash image and the flash image are obtained prior to the process of calculating the amount of main emission.

First, the process of detecting the moving body is executed on the non-flash image (step S60). That is, the moving body detecting section 54 extracts the moving body from the non-flash image and detects the position and size of the moving body. The moving body detection here is executed by comparing the non-flash image with the through-the-lens image obtained immediately before the non-flash image is obtained, for example, as in the above-described embodiments. The information on the position and size of the detected moving body is outputted to the CPU 42, which in turn provides the obtained information for the dimmer 70.

The dimmer 70 executes the detection process of the moving body containing area based on the result of moving body detection in the obtained non-flash image, as shown in FIG. 14A (step S61). That is, the dimmer 70 causes the moving body containing area detecting section 70A to divide the non-flash image into a plurality of areas and detect the area that contains the moving body (moving body containing area). The information on the moving body containing area detected is provided for the luminance calculating section 70B.

When the moving body containing area is detected, the dimmer 70 calculates the average luminance for each area in the non-flash image (step S62). That is, the dimmer 70 causes the luminance calculating section 70B to divide the non-flash image into a plurality of areas (in the example, 8×8) and calculate the average luminance for each of the resultant areas.

Thereafter, the luminance calculating section 70B calculates the average luminance for the moving body containing area in the non-flash image based on the information on the result of the moving body containing area detection by the moving body containing area detecting section 70A.

When the average luminance for the moving body containing area has been calculated for the non-flash image, then the moving body detecting process is executed for the flash image (step S64). The moving body detection here is executed by comparing the flash image with the non-flash image or the through-the-lens image obtained immediately before the non-flash image is obtained, for example, as in the above-described embodiments. Then, based on the detection result, the moving body containing area in the flash image is detected (step S65).

The average luminance for each area in the flash image is calculated (step S66), and then the average luminance for the moving body containing area in the flash image is calculated (step S67).

When the average luminance for the moving body containing area in the non-flash image and the average luminance for the moving body containing area in the flash image are calculated as described above, the emission amount calculating section 70C calculates the amount of flash emission light for the main photographing (the main emission amount) based on the average luminance for the moving body containing area in the non-flash image calculated and the average luminance for the moving body containing area in the flash image (step S68).

As such, when the average luminance for the moving body containing area is to be calculated, the average luminance for each area may be calculated, and then the average luminance for moving body containing area may be calculated by using the information on the average luminance for each of the calculated areas.

When the AE detecting section 38 calculates the average luminance for each area, the average luminance for the moving body containing area may be calculated by using the information on the calculation result.

Fifth Embodiment

Another embodiment for calculating the amount of main emission based on an image of a moving body in the angle of view will be described.

Although the third and fourth embodiments are adapted to calculate the amount of main emission only based on the moving body image, the embodiment may be adapted to calculate the amount of main emission from the entire image by changing the weights to be given to the moving body containing area and the moving body uncontaining area (make the weight to be given to the moving body containing area more than the weight to be given to the moving body uncontaining area).

A case in which the amount of main emission is calculated from the entire image by changing the weights to be given to the moving body containing area and the moving body uncontaining area will be described below.

The configuration of the dimmer is the same as that in the first embodiment.

Figure 16:
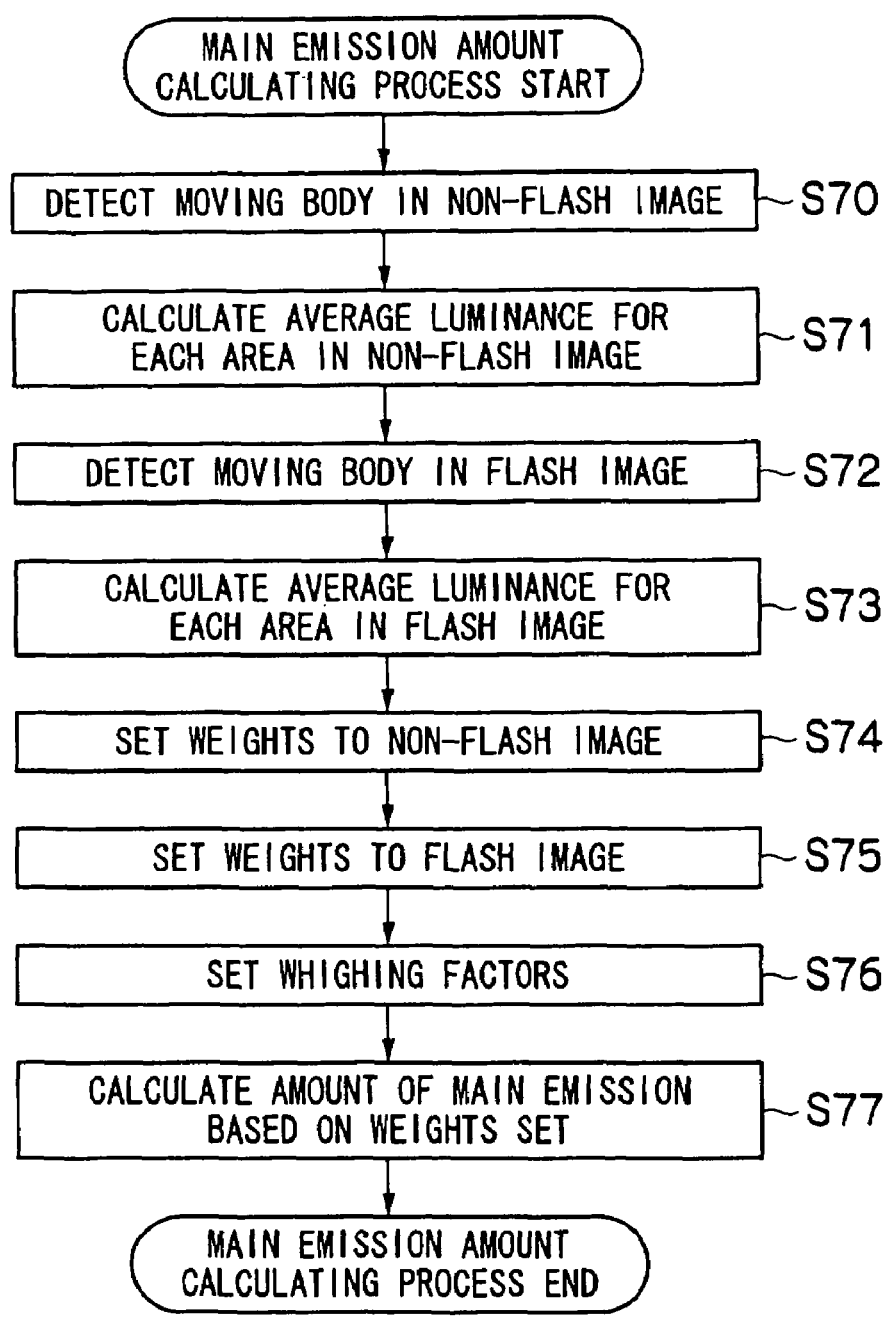
FIG. 16 is a flowchart showing a fifth embodiment of the process procedure of calculating the amount of main emission.

FIG. 16 is a flowchart showing the fifth embodiment of the process procedure of calculating the amount of main emission.

The embodiment is the same as the third embodiment in that the non-flash image and the flash image are obtained prior to the process of calculating the amount of main emission.

First, the process of detecting the moving body is executed on the obtained non-flash image (step S70). The moving body detection here is executed by comparing the non-flash image with the through-the-lens image obtained immediately before the non-flash image is obtained, for example, as in the above-described embodiments. The information on the position and size of the detected moving body is outputted to the CPU 42, which in turn provides the obtained information for the dimmer 56.

Next, the calculation process of the average luminance for each area from the obtained non-flash image is executed (step S71).

Next, the process of detecting the moving body from the obtained flash image is executed (step S72). The moving body detection here is executed by comparing the flash image with the non-flash image or the through-the-lens image obtained immediately before the non-flash image is obtained, for example, as in the above-described embodiments. The information on the position and size of the detected moving body is outputted to the CPU 42, which in turn provides the obtained information for the dimmer 56.

Next, the calculation process of the average luminance for each area from the obtained flash image is executed (step S73).

Next, the presence of the moving body is determined for each of the resultant areas (for each of the areas divided for calculating the average luminance for each area) in the non-flash image based on the information on the result of moving body detection, and sets the weight to each area (step S74). Here, 1 is set to the weight for the area containing a moving body, whereas 0 is set to the weight for the area containing no moving body.

In the similar manner, the presence of the moving body in each of the resultant areas is determined based on the information on the result of moving body detection for the flash image, and the weight is set to each area (step S75).

When the weights are set to the flash image, the CPU 42 executes the process of setting the weighing factor to be given to each area (step S76).

Here, the weights set to the non-flash image and the weights set to the flash image are mixed, the weights to be set to respective areas (=the weights to be multiplied by the weighting factor previously set for each area) are calculated, and the calculated weights for the respective areas are multiplied by the previously set weighing factors for the respective areas to calculate the weighing factors to be used in calculating the amount of main emission.

Thereafter, the CPU 42 causes the emission amount calculating section 56B of the dimmer 56 to execute the calculating process of the amount of flash emission light for the main photographing (the amount of main emission) by using the calculated weighing factors (step S77).

As such, the way of calculating the amount of main emission according to the embodiment also enables the amount of emission to be properly set based on the moving body image.

Although 0 is set to the weights to the moving body uncontaining area in the above-described example, the weights to the moving body containing area only need to be set at least lower than the weights to the moving body containing area. Accordingly, 0.5 may also be set to the weights to the moving body uncontaining area and 1 may be set to the weights to the moving body containing area.

Although the weight to be set to each area (=the weight to be multiplied by the weighing factor previously set for each area) is calculated by multiplying the weight set to the non-flash image by the weight set to the flash image in the above-described embodiment, the way of calculating the weight to be set to each area is not limited to that. The weight to be set to each area may be calculated by adding the weight set to the non-flash image and the weight set to the flash image for each area and then multiplying the result by ½ for each area.

Sixth Embodiment

As described above, when the main object is moving, the amount of main emission is calculated based on the image for the area that contains the moving body so that a good image can be taken with more proper brightness.

On the other hand, when the main object is stationary and the background is moving (the background contains a moving body), the amount of main emission is calculated based on the image for the area that contains no moving body so that a good image can be taken with more proper brightness.

Therefore, the process of calculating the amount of main emission is switched according to whether the moving body is the main object or not so that the flash can always be emitted in proper brightness, and thereby a good image can be taken.

Then, the embodiment switches the process of calculating the amount of main emission according to whether the moving body is the main object or not. Specifically, when the moving body is the main object, the amount of main emission is calculated by the method of the third, fourth, or fifth embodiment, whereas the moving body is not the main object, the amount of main emission is calculated by the method of the first or second embodiment.

A process procedure in the case in which when the moving body is the main object, the amount of main emission is calculated by the method of the fifth embodiment, and when the moving body is not the main object, the amount of main emission is calculated by the method of the second embodiment will be described below.

The configuration of the dimmer is the same as the above-described digital camera of the first embodiment.

Figure 17:
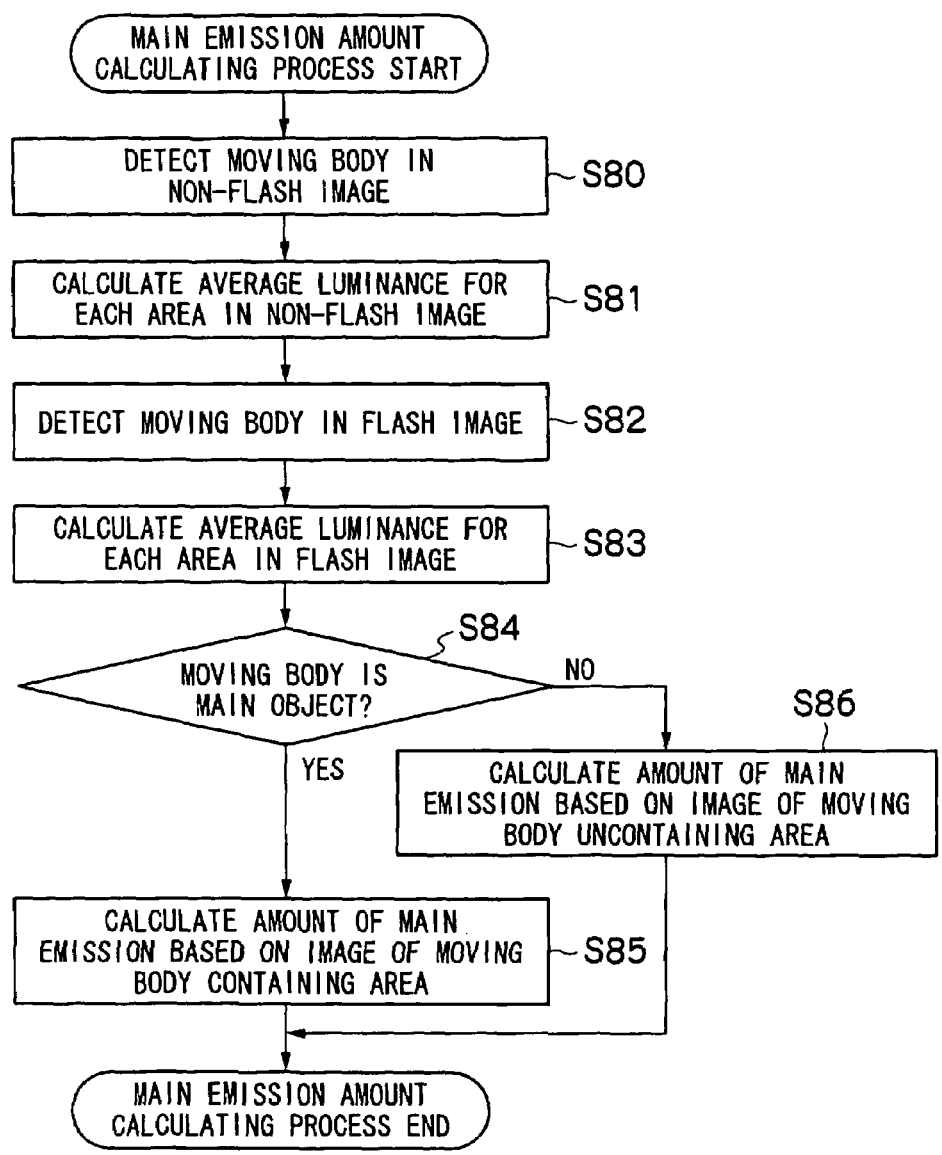
FIG. 17 is a flowchart showing a sixth embodiment of the process procedure of calculating the amount of main emission.

FIG. 17 is a flowchart showing the sixth embodiment of the process procedure of calculating the amount of main emission.

The embodiment is the same as the first embodiment in that the non-flash image and the flash image are obtained prior to the process of calculating the amount of main emission.

First, the process of detecting the moving body is executed on the obtained non-flash image (step S80). The moving body detection here is executed by comparing the non-flash image with the through-the-lens image obtained immediately before the non-flash image is obtained, for example, as in the above-described embodiments.

Next, the calculation process of the average luminance for each area from the obtained non-flash image is executed (step S81).

Next, the process of detecting the moving body from the obtained flash image is executed (step S82). The moving body detection here is executed by comparing the flash image with the non-flash image or the through-the-lens image obtained immediately before the non-flash image is obtained, for example, as in the above-described embodiments.

Next, the calculation process of the average luminance for each area from the obtained flash image is executed (step S83).

Next, whether the detected moving body is the main object or not is determined (step S84), and if it is the main object, the calculation process of the amount of main emission is executed based on the image of the moving body containing area. That is, the calculation process of the amount of main emission is executed in the process procedure of calculating the amount of main emission, which is described in the fifth embodiment (process shown in steps S74 to S77).

On the other hand, if the moving body is not the main object, the calculation process of the amount of main emission is executed based on the image of the moving body uncontaining area. That is, the calculation process of the amount of main emission is executed in the process procedure of calculating the amount of main emission, which is described in the second embodiment (process shown in steps S34 to S41).

Here, whether the detected moving body is the main object or not is determined on the basis of whether the main object is the person's face or not. That is, if the face detected by the face detecting section agrees with the moving body detected by the moving body detecting section, it is determined that the moving body is the main object.

The process of calculating the amount of main emission is switched according to whether the moving body is the main object or not so that the flash can be emitted in the proper amount of emission for each scene, and thereby stable image capturing can be achieved.

The process of calculating the amount of main emission that is executed when the moving body is the main object may be executed in the manner described in any of the third to fifth embodiments. Similarly, the process of calculating the amount of main emission that is executed when the moving body is not the main object may be executed in the manner described in either the first or second embodiments.

Although whether the moving body is the main object or not is determined in accordance with whether the moving body is a person's face or not in the above-described example, the determination on whether the moving body is the main object or not is not limited to that. Whether the moving body is the main object or not can be determined on the basis of the user's setting, for example. That is, if it is previously known that a moving body is to be taken as the main object, the camera is available for previous setting to calculate the amount of main emission based on the image of the moving body so that the process of calculating the amount of main emission is executed on the basis of the setting. Similarly, if it is known that a stationary object is to be taken as the main object, the camera is available for previous setting to calculate the amount of main emission based on the image of something other than a moving body so that the process of calculating the amount of emission is executed on the basis of the setting. Those settings are available on the menu screen or the like, for example.

If determination on whether the moving body is the main object or not is made based on a person's face, the process may be switched on the basis of the size of the person's face (the proportion of the face size to the screen size). That is, if the moving body is a person's face but relatively small to the screen size, it is determined that it is not the main object, and the amount of main emission is calculated on the basis of the image of something other than the moving body. That makes the process more properly switched.

Although the present invention has been described as implemented by a digital camera in the series of the embodiments above, the present invention is not limited to that application and may be applied to all appliances that are equipped with a flash photographing function. In that case, the flash device may be built in the appliance or may be attached to the appliance.

Although the above embodiments have been described by assuming that they execute flash photographing, the flash photographing is executed in accordance with the setting mode of the camera. For example, if the camera is in the forced emission mode, the camera always executes the flash photographing. If the camera is in the automatic mode, the camera executes the flash photographing in accordance with the brightness of the object.

What is claimed is:

1. A flash emission method, comprising:
   in an appliance equipped with a flash photography function, obtaining a non-flash image that is taken without a flash emitted;
   obtaining a flash image that is taken with the flash emitted in a predetermined amount of emission light;
   extracting an area that contains a moving body and a non-moving body from the non-flash image obtained;
   extracting an area that contains a moving body and a non-moving body from the flash image obtained;
   calculating an amount of an emission light for a main emission of the flash based on an image of the non-moving body in the non-flash image and an image of the non-moving body in the flash image; and
   causing the main emission of he flash in the calculated amount of the emission light.

2. The flash emission method according to claim 1, wherein the extraction of the area that contains the moving body and the non-moving body is executed by identifying the moving body based on the non-flash image and the flash image obtained, and extracting an area that contains the identified moving body.

3. The flash emission method according to claim 1, wherein the extraction of the area that contains the moving body and the non-moving body is executed by identifying the moving body based on an image that is obtained before the non-flash image and the flash image are obtained and extracting an area that contains the identified moving body.

4. The flash emission method according to claim 1, wherein said calculating the amount of the emission light comprises calculating an entirety of the amount of the emission light for the main emission of the flash based on the image of the non-moving body in the non-flash image and the image of the non-moving body in the flash image.

5. The flash emission method according to claim 1, wherein the amount of the emission light for the main emission of the flash is calculated based on regions of the flash image and the non-flash region that are devoid of the moving body.

6. A flash emission method, comprising:
   in an appliance equipped with a flash photography function, obtaining a non-flash image that is taken without a flash emitted;
   obtaining a flash image that is taken with the flash emitted in a predetermined amount of emission light;
   dividing the obtained non-flash image into a plurality of areas;
   dividing the obtained flash image into a plurality of areas;
   extracting an area that contains a moving body from the non-flash image divided;
   extracting an area that contains a moving body from the flash image divided;
   calculating luminance for each area in the non-flash image divided;
   calculating luminance for each area in the flash image divided;
   obtaining a difference value of luminance for each area by calculating a difference of luminance between each area in the non-flash image and each area in the flash image, wherein the luminance is calculated for each area;
   setting a weight to be given to each area by grouping the areas into areas each of which contains a moving body and areas each of which contains no moving body;
   obtaining reflection luminance by calculating a weighted mean by adding the weight to the calculated difference value of luminance for each area;
   obtaining non-flash luminance by calculating a weighted mean by adding the weight to the luminance for each area in the non-flash image;
   calculating an amount of an emission light for a main emission of the flash based on the obtained reflection luminance and non-flash luminance; and
   causing the main emission of the flash in the calculated amount of the emission light.

7. The flash emission method according to claim 6, wherein the setting a weight to be given to each area comprises:
   setting a weight to be given to each area by grouping the areas in the non-flash image into areas each of which contains a moving body and areas each of which contains no moving body;
   setting a weight to be given to each area by grouping the areas in the flash image into areas each of which contains a moving body and areas each of which contains no moving body; and
   setting a weight to be given to each area by mixing the weight set to each area in the non-flash image and the weight set to each area in the flash image.

8. The flash emission method according to claim 7, wherein the setting a weight to be given to each area sets the weight to be given to each area by setting the weight to be given to each area which contains a moving body lower than the weight to be given to each area which contains no moving body.

9. The flash emission method according to claim 6, wherein the setting a weight to be given to each area sets the weight to be given to each area by setting the weight to be given to each area which contains a moving body lower than the weight to be given to each area which contains no moving body.

10. The flash emission method according to claim 6, wherein the extraction of the area that contains the moving body is executed by identifying the moving body based on the non-flash image and flash image obtained, and extracting an area that contains the identified moving body.

11. The flash emission method according to claim 6, wherein the extraction of the area that contains the moving body is executed by identifying the moving body based on an image that is obtained before the non-flash image and the flash image are obtained and extracting an area that contains the identified moving body.

12. A flash emission method, comprising:
in an appliance equipped with a flash photography function, obtaining a non-flash image that is taken without a flash emitted;
obtaining a flash image that is taken with the flash emitted in a predetermined amount of emission light;
extracting an area that contains a moving body from the non-flash image obtained;
extracting an area that contains a moving body from the flash image obtained;
calculating an amount of an emission light for a main emission of the flash based on an image of an area that contains the moving body in the non-flash image and an image of an area that contains the moving body in the flash image; and
causing the main emission of the flash in the calculated amount of he emission light.

13. The flash emission method according to claim 12, wherein the extraction of the area that contains the moving body is executed by identifying the moving body based on the non-flash image and flash image obtained, and extracting an area that contains the identified moving body.

14. The flash emission method according to claim 12, wherein the extraction of the area that contains the moving body is executed by identifying the moving body based on an image that is obtained before the non-flash image and the flash image are obtained and extracting an area that contains the identified moving body.

15. A flash emission method, comprising:
in an appliance equipped with a flash photography function, obtaining a non-flash image that is taken without a flash emitted;
obtaining a flash image that is taken with the flash emitted in a predetermined amount of emission light;
extracting an area that contains a moving body and a non-moving body from the non-flash image obtained;
extracting an area that contains a moving body and a non-moving body from he flash image obtained;
determining whether a moving body is a main object;
when the moving body is the main object, calculating an amount of emission light for main emission based on an image of an area that contains the moving body in the non-flash image and an image of an area that contains the moving body in the flash image;
when the moving body is not the main object, calculating an amount of an emission light for a main emission of the flash based on an image of the non-moving body in the non-flash image and an image of the non-moving body in the flash image; and
causing the main emission of he flash in the calculated amount of the emission light.

16. The flash emission method according to claim 15, wherein the determining whether a moving body is a main object determines whether the moving body is a face, and when the moving body is a face, determining that the moving body is the main object.

17. The flash emission method according to claim 15, wherein the extraction of the area that contains the moving body is executed by identifying the moving body based on the non-flash image and flash image obtained, and extracting an area that contains the identified moving body.

18. The flash emission method according to claim 15, wherein the extraction of the area that contains the moving body and the non-moving body is executed by identifying the moving body based on an image that is obtained before the non-flash image and the flash image are obtained and extracting an area that contains the identified moving body.

19. A flash emission apparatus, comprising:
a non-flash image obtaining device, located in an appliance equipped with a flash photography function, that obtains a non-flash image that is taken without a flash emitted;
a flash image obtaining device that obtains a flash image that is taken with the flash emitted in a predetermined amount of emission light;
a first moving body and non-moving body containing area extracting device that extracts an area that contains a moving body and a non-moving body from the non-flash image obtained by the non-flash image obtaining device;
a second moving body and non-moving body containing area extracting device that extracts an area that contains a moving body and a non-moving body from the flash image obtained by the flash image obtaining device;
an emission light amount calculating device that calculates an amount of an emission light for a main emission of the flash based on an image of the non-moving body in the non-flash image and an image of the non-moving body in the flash image; and
an emission controlling device that causes the main emission of the flash in the amount of the emission light calculated by the emission light amount calculating device.

20. The flash emission apparatus according to claim 19, further comprising:
a moving body identifying device that identifies the moving body based on the non-flash image obtained by the non-flash image obtaining device and the flash image obtained by the flash image obtaining device,
wherein the first moving body and non-moving body containing area extracting device and the second moving body and non-moving body containing area extracting device extract an area that contains the moving body identified by the moving body identifying device from the non-flash image and the flash image.

21. The flash emission apparatus according to claim 19, further comprising:
a serial image obtaining device that serially obtains images before obtaining the non-flash image and the flash image; and
a moving body identifying device that identifies the moving body based on the images that are serially obtained by the serial image obtaining device,
wherein the first moving body and non-moving body containing area extracting device and the second moving body and non-moving body containing area extracting device extract an area that contains the moving body identified by the moving body identifying device from the non-flash image and the flash image.

22. The flash emission apparatus according to claim 19, wherein the emission light amount calculating device calculates an entirety of the amount of the emission light for the main emission of the flash based on the image of the non-moving body in the non-flash image and an image of the non-moving body in the flash image.

23. The flash emission apparatus according to claim 19, wherein the emission light amount calculating device calculates the amount of the emission light for the main emission of the flash based on regions of the flash image and the non-flash region that are devoid of the moving body.

24. A flash emission apparatus, comprising:
- a non-flash image obtaining device, located in an appliance equipped with a flash photography function, that obtains a non-flash image that is taken without a flash emitted;
- a flash image obtaining device that obtains a flash image that is taken with the flash emitted in a predetermined amount of emission light;
- a first area dividing device that divides the non-flash image into a plurality of areas;
- a second area dividing device that divides the flash image into a plurality of areas;
- a first moving body containing area extracting device that extracts an area that contains a moving body from the non-flash image that is divided by the first area dividing device into a plurality of areas;
- a second moving body containing area extracting device that extracts an area that contains a moving body from the flash image that is divided by the second area dividing device into a plurality of areas;
- a first luminance calculating device that calculates luminance for each area in the non-flash image divided by the first area dividing device into a plurality of areas;
- a second luminance calculating device that calculates luminance for each area in the flash image divided by the second area dividing device into a plurality of areas;
- a difference value calculating device that calculates a difference value for each area, the difference value between each area in the non-flash image and each area in the flash image, wherein the luminance is calculated for each area;
- a weight setting device that sets a weight to be given to each area by grouping the areas into areas each of which contains a moving body and areas each of which contains no moving body;
- a reflection luminance calculating device that calculates reflection luminance by calculating a weighted mean by adding the weight set by the weight setting device to the difference value of luminance for each area that is calculated by the difference value calculating device;
- a non-flash image luminance calculating device that calculates the non-flash luminance by calculating a weighted mean by adding the weight set by the weight setting device to the luminance for each area in the non-flash image;
- a main emission amount calculating device that calculates an amount of an emission light for a main emission of the flash based on the reflection luminance that is calculated by the reflection luminance calculating device and the non-flash luminance that is calculated by the non-flash image luminance calculating device; and
- an emission controlling device that causes the main emission of the flash in the amount of the emission light calculated by the main emission amount calculating device.

25. The flash emission apparatus according to claim 24, wherein the weight setting device sets a weight to be given to each area by grouping the areas in the non-flash image into areas each of which contains a moving body and areas each of which contains no moving body, sets a weight to be given to each area by grouping the areas in the flash image into areas each of which contains a moving body and areas each of which contains no moving body, and sets a weight to be given to each area by mixing the weight set to each area in the non-flash image and the weight set to each area in the flash image.

26. The flash emission apparatus according to claim 25, wherein the weight setting device sets the weight to be given to each area by setting the weight to be given to each area which contains a moving body lower than the weight to be given to each area which contains no moving body.

27. The flash emission apparatus according to claim 24, wherein the weight setting device sets the weight to be given to each area by setting the weight to be given to each area which contains a moving body lower than the weight to be given to each area which contains no moving body.

28. The flash emission apparatus according to claim 24, further comprising:
- a moving body identifying device that identifies the moving body based on the non-flash image obtained by the non-flash image obtaining device and the flash image obtained by the flash image obtaining device; wherein
- the first moving body containing area extracting device and the second moving body containing area extracting device extract an area that contains the moving body identified by the moving body identifying device from the non-flash image and the flash image.

29. A flash emission apparatus, comprising:
- a non-flash image obtaining device, located in an appliance equipped with a flash photography function, that obtains a non-flash image that is taken without a flash emitted;
- a flash image obtaining device that obtains a flash image that is taken with the flash emitted in a predetermined amount of emission light;
- a first moving body containing area extracting device that extracts an area that contains a moving body from the non-flash image obtained by the non-flash image obtaining device;
- a second moving body containing area extracting device that extracts the area that contains a moving body from the flash image obtained by the flash image obtaining device;
- an emission light amount calculating device that calculates an amount of an emission light for a main emission of the flash based on an image of an area extracted by the first moving body containing area extracting device and an image of an area extracted by the second moving body containing area extracting device; and
- an emission controlling device that causes the main emission of the flash in the amount of the emission light calculated by the emission light amount calculating device.

30. The flash emission apparatus according to claim 29, further comprising:
- a moving body identifying device that identifies the moving body based on the non-flash image obtained by the non-flash image obtaining device and the flash image obtained by the flash image obtaining device; wherein
- the first moving body containing area extracting device and the second moving body containing area extracting device extract an area that contains the moving body identified by the moving body identifying device from the non-flash image and the flash image.

31. A flash emission apparatus, comprising:
- a non-flash image obtaining device, located in an appliance equipped with a flash photography function, that obtains a non-flash image that is taken without a flash emitted;
- a flash image obtaining device that obtains a flash image that is taken with the flash emitted in a predetermined amount of emission light;
- a first moving body and non-moving body containing area extracting device that extracts an area that contains a moving body and a non-moving body from the non-flash image obtained by the non-flash image obtaining device;

a second moving body and non-moving body containing area extracting device that extracts the area that contains a moving body and a non-moving body from the flash image obtained by the flash image obtaining device;

a determining device that determines whether a moving body is a main object;

a first emission light amount calculating device that calculates an amount of an emission light for a main emission of the flash based on an image of an area that contains the moving body in the non-flash image and an image of an area that contains the moving body in the flash image, when the moving body is the main object;

a second emission light amount calculating device that calculates the amount of the emission light for the main emission of the flash based on the image of the non-moving body in the non-flash image and the image of the non-moving body in the flash image, when the moving body is not he main object; and an emission controlling device that causes the main emission of the flash in the amount of the emission light calculated by the first emission light amount calculating device or the second emission light amount calculating device.

32. The flash emission apparatus according to claim 31, comprising:

a first face extracting device that extracts a face from the non-flash image that is obtained by the non-flash image obtaining device; and a second face extracting device that extracts the face from the flash image that is obtained by the flash image obtaining device, wherein the determining device determines whether the moving body is the face, and when the moving body is the face, determines that the moving body is the main object.

* * * * *